US011062226B2

(12) United States Patent
Musuvathi et al.

(10) Patent No.: US 11,062,226 B2
(45) Date of Patent: Jul. 13, 2021

(54) DETERMINING A LIKELIHOOD OF A USER INTERACTION WITH A CONTENT ELEMENT

(71) Applicant: Microsoft Technology Licensing, LLC, Redmond, WA (US)

(72) Inventors: Madanlal S. Musuvathi, Redmond, WA (US); Todd D. Mytkowicz, Redmond, WA (US); Saeed Maleki, Seattle, WA (US); Yufei Ding, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 869 days.

(21) Appl. No.: 15/624,555

(22) Filed: Jun. 15, 2017

(65) Prior Publication Data
US 2018/0365580 A1   Dec. 20, 2018

(51) Int. Cl.
*G06N 7/00* (2006.01)
*G06N 20/00* (2019.01)
(Continued)

(52) U.S. Cl.
CPC .......... *G06N 7/005* (2013.01); *G06F 16/248* (2019.01); *G06F 16/24578* (2019.01);
(Continued)

(58) Field of Classification Search
CPC .......... G06N 7/005; G06N 20/00; G06N 5/04; G06F 16/9558; G06F 16/24578; G06F 16/951; G06F 16/248; G06Q 30/0244
See application file for complete search history.

(56) References Cited

U.S. PATENT DOCUMENTS 7,451,071 B2   11/2008   Ferguson et al.
7,996,814 B1   8/2011    Qureshi et al.
(Continued)

FOREIGN PATENT DOCUMENTS

CN   104598565 A   5/2015
CN   102750309 B   6/2015
(Continued)

OTHER PUBLICATIONS

Chapelle et al, Simple and Scalable Response Prediction for Display Advertising, 2014, ACM, ACM transactions on Intelligent Systems and Technology, vol. 5, No. 4, Article 61 (Year: 2014).*
(Continued)

*Primary Examiner* — Luis A Sitiriche
*Assistant Examiner* — Casey R. Garner
(74) *Attorney, Agent, or Firm* — Newport IP, LLC; Jacob P. Rohwer

(57) ABSTRACT

Described herein is a system that transmits and combines local models, that individually comprise a set of local parameters computed via stochastic gradient descent (SGD), into a global model that comprises a set of global model parameters. The local models are computed in parallel at different geographic locations along with symbolic representations. The symbolic representations can be used to combine the local models. The global model can determine a likelihood, given a new data instance of a feature set, that a user performs a computer interaction with the content element. For instance, the system can use the model to provide search results in response to a search query submitted by a user. Or, the system can use the model to make a recommendation or suggestion to a user in response to a request for content (e.g., display a targeted advertisement, suggest a news story, etc.).

19 Claims, 8 Drawing Sheets

(51) Int. Cl.
*G06F 16/248* (2019.01)
*G06F 16/951* (2019.01)
*G06F 16/955* (2019.01)
*G06F 16/2457* (2019.01)
*G06N 5/04* (2006.01)
*G06Q 30/02* (2012.01)

(52) U.S. Cl.
CPC ........ *G06F 16/951* (2019.01); *G06F 16/9558* (2019.01); *G06N 5/04* (2013.01); *G06N 20/00* (2019.01); *G06Q 30/0244* (2013.01)

(56) References Cited

U.S. PATENT DOCUMENTS

| | | |
|---|---|---|
| 8,060,456 B2 | 11/2011 | Gao et al. |
| 8,626,677 B2 | 1/2014 | Chen et al. |
| 8,743,543 B2 | 6/2014 | Clidaras et al. |
| 9,201,989 B2 | 12/2015 | Haas et al. |
| 9,218,573 B1 | 12/2015 | Corrado et al. |
| 9,240,184 B1 | 1/2016 | Lin et al. |
| 9,418,334 B2 | 8/2016 | Sainath et al. |
| 9,563,854 B2 | 2/2017 | Cruz Mota et al. |
| 9,948,663 B1 | 4/2018 | Wang et al. |
| 2001/0032198 A1 | 10/2001 | Pao et al. |
| 2007/0150424 A1 | 6/2007 | Igelnik |
| 2008/0209030 A1 | 8/2008 | Goldszmidt et al. |
| 2008/0228680 A1 | 9/2008 | Chen et al. |
| 2009/0024356 A1 | 1/2009 | Platt et al. |
| 2009/0172024 A1 | 7/2009 | Hsu et al. |
| 2011/0093416 A1 | 4/2011 | Pelossof et al. |
| 2011/0191315 A1* | 8/2011 | Neumeyer ......... G06Q 30/0243 707/706 |
| 2011/0208714 A1 | 8/2011 | Soukal et al. |
| 2011/0295774 A1 | 12/2011 | Chen et al. |
| 2014/0100703 A1 | 4/2014 | Dull et al. |
| 2014/0142929 A1 | 5/2014 | Seide et al. |
| 2014/0164299 A1 | 6/2014 | Sainath et al. |
| 2014/0214735 A1 | 7/2014 | Harik |
| 2014/0316809 A1 | 10/2014 | Cane |
| 2015/0019214 A1 | 1/2015 | Wang et al. |
| 2015/0161988 A1 | 6/2015 | Dognin et al. |
| 2015/0193695 A1 | 7/2015 | Cruz mota et al. |
| 2016/0036837 A1 | 2/2016 | Jain et al. |
| 2016/0071023 A1 | 3/2016 | Eicher et al. |
| 2016/0103559 A1 | 4/2016 | Maheshwari et al. |
| 2016/0104076 A1 | 4/2016 | Maheshwari et al. |
| 2017/0006135 A1 | 1/2017 | Siebel et al. |
| 2017/0017886 A1 | 1/2017 | Gao et al. |
| 2017/0147920 A1 | 5/2017 | Huo et al. |
| 2017/0213148 A1 | 7/2017 | Mytkowicz et al. |
| 2017/0293638 A1 | 10/2017 | He et al. |
| 2017/0359362 A1 | 12/2017 | Kashi et al. |
| 2018/0365093 A1 | 12/2018 | Musuvathi et al. |
| 2018/0365582 A1 | 12/2018 | Musuvathi et al. |
| 2018/0367550 A1 | 12/2018 | Musuvathi et al. |

FOREIGN PATENT DOCUMENTS

| | | | |
|---|---|---|---|
| WO | WO-2009100528 A1 * | 8/2009 | .......... G06F 11/3495 |
| WO | 2015003436 A1 | 1/2015 | |
| WO | 2015103514 A1 | 7/2015 | |
| WO | 2015154216 A1 | 10/2015 | |

OTHER PUBLICATIONS

Menon et al, Response Prediction Using Collaborative Filtering with Hierarchies and Side-information, 2011, ACM, KDD'11 (Year: 2011).*
Zinkevich, et al., "Parallelized Stochastic Gradient Descent", In Journal of Advances in neural information processing systems, Dec. 6, 2010, pp. 1-9.
Hammer, et al., "Automatic security classification by machine learning for cross-domain information exchange", In Proceedings of IEEE Military Communications Conference, Oct. 10, 26, 6 pages.
Mahajan, et al., "A Parallel SGD method with Strong Convergence", In Journal of Computing Research Repository, Nov. 2013, pp. 1-5.
Niu, et al., "Hogwild!: A Lock-Free Approach to Parallelizing Stochastic Gradient Descent", In Journal of Computing Research Repository, Jun. 2011, pp. 1-22.
Akbar, et al., "Improving network security using machine learning techniques", In Proceedings of IEEE International Conference on Computational Intelligence & Computing Research, Dec. 18, 2012, 2 pages.
Hadgu, et al., "Large-scale learning with AdaGrad on Spark", In Proceedings of IEEE International Conference on Big Data (Big Data), Oct. 29, 2015, pp. 2828-2830.
Singh, et al., "Integrating Machine Learning Techniques to Constitute a Hybrid Security System", In Proceedings of Fourth International Conference on Communication Systems and Network Technologies, Apr. 7, 2014, 2 pages.
Bach, Francis, "Stochastic gradient methods for machine learning", In Technical report of INRIA-ENS, Apr. 2013, 48 pages.
Bottou, Leon, "Large-Scale Machine Learning with Stochastic Gradient Descent", In Proceedings of 9th International Conference on Computational Statistics, Aug. 22, 2010, 10 pages.
Hegedus, et al., "Distributed Differentially Private Stochastic Gradient Descent: An Empirical Study", In Proceedings of 24th Euromicro International Conference on Parallel, Distributed, and Network-Based Processing, Feb. 17, 2016, 8 pages.
Seide, et al., "1-Bit Stochastic Gradient Descent and its Application to Data-Parallel Distributed Training of Speech DNNs", In Proceedings of 15th Annual Conference of the International Speech Communication Association, Sep. 14, 2014, pp. 1058-1062.
Zheng, et al., "SpeeDO: Parallelizing Stochastic Gradient Descent for Deep Convolutional Neural Network", http://web.archive.org/web/20151216151331/http:/learningsys.org/papers/LearningSys_2015_paper_13.pdf, Published on: Dec. 16, 2015, 1-6 pages.
Smola, Alexander J., "Adventures in Data Land", http://blog.smola.org/post/977927287/parallel-stochastic-gradient-descent, Published on: Sep. 2, 2010 , 8 pages.
Meeds, et al., "MLitB: machine learning in the browser", In Journal of PeerJ Computer Science, vol. 1, Jul. 29, 2015, 18 pages.
Ruder, Sebastian, "An overview of gradient descent optimization algorithms", http://sebastianruder.com/optimizing-gradient-descent/, Published on: Jan. 19, 2016, 45 pages.
Delalleau, et al., "Parallel Stochastic Gradient Descent", In Journal of CIAR Summer School, Aug. 11, 2007, 29 pages.
"Big Data Analytics", https://www.ismll.uni-hildesheim.de/lehre/bd-16s/script/bd-08-sgd.pdf, Retrieved on: Oct. 17, 2016, pp. 1-27.
Smith, et al., "Neural networks in business: techniques and applications for the operations researcher", In Journal of Computers & Operations Research, vol. 27, Issues 11-12, Sep. 2000, pp. 1023-1044.
Bottou, Leon, "Stochastic Gradient Descent Tricks", In Publication of Springer, Jan. 1, 2012, pp. 1-16.
"Notice of Allowance Issued in U.S. Appl. No. 15/624,660", dated Apr. 24, 2019, 9 Pages.
"Non-Final Office Action Issued in U.S. Appl. No. 15/624,614", dated Jun. 20, 2019, 29 Pages.
Lee, et al., "On Model Parallelization and Scheduling Strategies for Distributed Machine Learning", In Proceedings of Advances in Neural Information Processing Systems, Published on: Dec. 3, 2014. 9 pages.
Keuper, et al., "Asynchronous Parallel Stochastic Gradient Descent—A Numeric Core for Scalable Distributed Machine Learning Algorithms", In Proceedings of the Workshop on Machine Learning in High-Performance Computing Environments, Published on: Nov. 15, 2015, 25 pages.
Zhang, et al., "Deep Learning with Elastic Averaging SGD", In Proceedings of Advances in Neural Information Processing Systems, Published on: Dec. 7, 2015, 24 pages.
Chen, et al., "Scalable Training of Deep Learning Machines by Incremental Block Training with Intra-Block Parallel Optimization and Blockwise Model-Updated Filtering", In Proceedings of IEEE

(56) References Cited

OTHER PUBLICATIONS

International Conference on Acoustics, Speech and Signal Processing, Mar. 20, 2016, pp. 5880-5884.
"Applicant Initiated Interview Summary Issued in U.S. Appl. No. 15/624,660", dated Feb. 26, 2019, 3 Pages.
Bergstra, et al., "Theano: A CPU and GPU Math Compiler in Python", In the Proceedings of the 9th Python in Science Conference, Jul. 3, 2010, 7 Pages.
"Notice of Allowance Issued in U.S. Appl. No. 15/624,642", dated Nov. 23, 2020, 9 Pages.
Kim, et al., "STRADS: A Distributed Framework for scheduled Model Parallel Machine Learning", In Proceedings of the Eleventh European Conference on Computer Systems, Apr. 18, 2016, 16 Pages.
"Non Final Office Action Issued in U.S. Appl. No. 15/624,642", dated Aug. 7, 2020, 30 Pages.
Lee, et al., "Multi-Level and Multi-Scale Feature Aggregation Using Pretrained Convolutional Neural Networks for Music Auto-Tagging", In Proceedings of IEEE Signal Processing Letters, vol. 24, Issue 8, Aug. 8, 2017, pp. 1208-1212.

\* cited by examiner

DETERMINING A LIKELIHOOD OF A USER INTERACTION WITH A CONTENT ELEMENT

BACKGROUND

Stochastic gradient descent (SGD) comprises a method for regression and classification tasks. SGD uses a training dataset to generate a model via machine learning. SGD is a sequential algorithm which means that processing a current data instance of the training dataset to update parameters of the model depends on the parameters computed from the processing of a previous data instance of the training dataset. Stated another way, SGD iteratively processes data instances of the training dataset to compute (e.g., update) model parameters, and the computation at each iteration depends on the parameters learned from the previous iteration. Given a new data instance, the model and the model parameters can then be used to determine an output. Due to the sequential nature of SGD, however, computation of the parameters and generation of the model takes an extended period of time.

SUMMARY

The disclosed system is configured to use a parallel implementation of stochastic gradient descent (SGD) that processes a training dataset to compute parameters for a model that accurately reflect parameters that would have been computed had the training dataset been processed via a sequential implementation of SGD. The dataset can be referred to as a "training" dataset because a data instance in the training dataset can include a label indicating whether an outcome is true or false (e.g., whether the outcome occurs or not). For example, the label can indicate whether a user actually performed a computer interaction with a content element. The content element can be configured as a selectable content element such as a hyperlink associated with a uniform resource locator (URL). The content element can also or alternatively be configured as an icon representing a file to be opened (e.g., a document, a video, a spreadsheet, etc.). Therefore, the computer interaction can comprise a selection (e.g., a click via a mouse or an object such as a finger or a stylus, a hover over, etc.) of the content element that enables the user to consume additional information associated with the content element. Consequently, based on the labels associated with the data instances, the model can tune (e.g., update) its parameters via machine learning.

The system described herein is configured to use the model to determine a likelihood (e.g., a probability, a value) of an outcome associated with a content element. The model can be configured for use in association with search and/or recommendation techniques. For instance, the model can be used by a search and/or recommendation system to predict a likelihood of a user interest in the content element given a data instance as input. In various examples described herein, the outcome can be whether a user performs a computer interaction with a displayed content element and the determined likelihood can represent a likelihood of the user performing the computer interaction with the displayed content element. Consequently, the system can use various models for a number of different content elements to provide search results on a search engine results page (SERP) in response to a search query submitted by the user. In another example, the system can use various models for a number of different content elements to make a recommendation to a user (e.g., select a "targeted" advertisement to be displayed to the user).

A data instance comprises feature data for a feature set. The feature set can be defined by the system for search (e.g., for a search engine) and/or for recommendations (e.g., suggesting content such as an advertisement, a news story, a product or item, etc.). Thus, the feature set can include individual features, values for which are collected. The features can be related to user information such as an age or age range, gender (e.g., male, female, etc.), education, profession, annual income, city and state of residence, home address (e.g., a zip code), phone number (e.g., an area code), citizenship, languages spoken, user interests (e.g., activities, hobbies, etc.), health information, or any other information that may be stored and/or shared. The user information can be part of a received user profile (e.g., in an event the user is logged into an account). Additionally or alternatively, the feature set can include individual features related to device information such as a time of day a request is submitted, current geographic location (e.g., an IP address), recent device use history (e.g., search history, browsing history, application usage history, etc.), or any other device information that may be stored and/or shared. In some instances, the device information can also be part of a received user profile.

In various examples described herein, the training dataset used to compute the parameters for the model is split up amongst multiple different geographic locations (e.g., each geographic location comprises a training data "subset"). Moreover, the training data subsets are continually expanding. That is, each time a device and/or user submits a request that is routed via a particular geographic location (e.g., a search query to a search engine, a request for information in an application, etc.) a new data instance can be added to a training dataset. For example, various models can be used to determine content elements to display to the user based on the new data instance (e.g., an unlabeled data instance of the feature set), and labels can subsequently be created based on the content elements with which the user actually interacts. Thus, after using a model on the new data instance to determine a likelihood of the user interacting with a particular content element, the new data instance can become a training data instance that the model can use to update and tune its model parameters for the particular content element. Thus, the system can perform machine learning to improve the model.

In various examples, a geographic location can comprise one of multiple different datacenters being operated by an entity implementing a search system (e.g., a search engine) and/or a recommendation system. To implement parallelization of SGD, the system described herein includes a processing node at each geographic location. Given a set of starting model parameters so that the processing nodes have the same initial state, the processing nodes are configured to compute, in parallel, "local" models where an individual local model comprises a set of local model parameters computed via SGD based on a corresponding training data subset that is local to a processing node and to a geographic location. For instance, one or more data instances of a training data subset can be used to update parameters of an individual local model at each step or iteration of the SGD algorithm (e.g., an average update over multiple data instances can be computed in an individual step or iteration of SGD). From a location standpoint, this enables the processing and computation to occur "close" to where the data is received and stored (e.g., a datacenter to which a search query or request for information is routed). A feature set can comprise hundreds or thousands, if not millions, of individual features. Moreover, thousands or millions of data instances of the feature set can be received at the geographic location over a period of time. For example, a datacenter may receive millions of search queries in the span of a few minutes. Consequently, the datacenter can receive and/or generate millions of corresponding data instances of the feature set. In another example, a datacenter may receive millions of requests from users to view social media feeds, within which lies an opportunity to place recommended or suggested content (e.g., an advertisement, a link to a news story, etc.).

Consequently, a training data subset collected and maintained at a datacenter can comprise many terabytes of data or more, and as a result, transmitting the different training data subsets (e.g., a large amount of data) from the geographic locations to one designated geographic location so that one processing node can process the whole training dataset via a sequential implementation of SGD to produce a more robust model requires a large amount of resources (e.g., networking resources, processing resources, memory resources, etc.), and also introduces latency that delays the computation of the model parameters. Moreover, timeliness associated with the computation of the model parameters via the sequential implementation of SGD also suffers due to the inherent delay caused by the sequential processing of the data instances in the training dataset. As described herein, computing local models in parallel at separate locations, transmitting the local models instead of transmitting the large training data subsets, and then combining the local models computed in parallel, is more efficient from a resource perspective.

In addition to computing the local models in parallel, the processing nodes are further configured to compute symbolic representations in parallel, the symbolic representations being respectively associated with the local models. The symbolic representations are used when combining the local models into a "global" model. A symbolic representation represents how an adjustment to a set of starting model parameters affects the set of local model parameters computed for a corresponding local model. The adjustment is an unknown adjustment at a time when a symbolic representation is computed. Since each processing node starts with the same initial state (e.g., the same set of starting model parameters) when processing a training data subset in parallel (e.g., concurrent processing), the symbolic representations enable the local models to be combined into a global model that includes a set of global model parameters. Via the use of the symbolic representations, the set of global model parameters are essentially the same as a corresponding set of model parameters that would have been computed had the local models and their training data subsets been computed sequentially via SGD, rather than in parallel. Stated another way, at a time when the local models are being combined, a symbolic representation associated with a local model enables the set of starting parameters to mathematically shift to a known set of starting model parameters associated with an output of another local model, the output comprising the set of local model parameters computed for the other local model. By using the symbolic representations, the combination of a plurality of local models, computed in parallel, into a global model honors the sequential dependencies of SGD. This parallelization approach can be applied when the update to the model parameters is linear in a SGD computation or is linearly approximated.

In various examples described herein, a processing node receives local models that individually comprise a set of local parameters computed via SGD from other processing nodes. The local models can be associated with a content element and are computed based on training data subsets collected and maintained at the geographic locations (e.g., datacenters). Each training data subset includes multiple data instances of a feature set and, for each data instance, a label indicating whether a user interaction with the content element displayed occurs. In some examples, a label can be a real number. As described above, network transmission of the local models, rather than the training data subsets, conserves resources and decreases latency. The processing node also receives, from the other processing nodes, symbolic representations associated with the local models. The processing node is configured to combine, using the symbolic representations, the local models into a global model that includes a set of global model parameters. The global model can then be used to determine a likelihood, given a new data instance of a feature set, that a user performs a computer interaction with the content element.

In various examples, the system can use various models for a number of different content elements to provide search results in response to a search query submitted by the user. In another example, the system can use various models for a number of different content elements to make a recommendation to a user. In further examples, the system can use a single model configured to determine likelihoods (e.g., probabilities) for different content elements, such that the model includes parameters associated with features for a user and/or device that submits a request (e.g., a search query, a request for content, etc.), as well as parameters associated with features of a content element. In these further examples, the model is configured to match interests of a user with a content element, and thus a data instance of a feature set can include both features of the user and/or device and features of the content element.

Using the likelihoods computed by the model(s) as outputs, the system is configured to rank content elements to produce a set of ranked content elements. Further, the system can determine that a ranked position of an individual content element in the set of ranked content elements satisfies a ranking threshold, and therefore, can select the individual content element for display via a client computing device. In various examples, the ranking threshold can be associated with a top-ranked spot, such that the individual content element satisfies the ranking threshold and is selected to be displayed if the content element is the top-ranked content element (e.g., to be placed in a display area configured for one content element such as a "targeted" advertisement). In various examples, the ranking threshold can be associated with a cutoff position, such that the individual content element satisfies the ranking threshold and is selected to be displayed if the content element is above the cutoff position (e.g., the top ten, twenty, fifty, etc. hyperlinks/URL are selected for display in response to a search query). Consequently, via the use of the models and the rankings, content elements that the user is likely more interested in can be displayed.

In various examples, each processing node can send its local model and symbolic representation to the other processing nodes such that each processing node can compute its own global model. However, in other examples, one processing node is designated as the processing node to which the local models and the symbolic representations are sent. In these other examples, upon combining the local models into a global model using the symbolic representations, the processing node is configured to distribute the global model to the other processing nodes so the other processing nodes can also use the more robust global model computed based on a larger amount of data (e.g., compared to the local model). Therefore, via the techniques described herein, a geographic location can leverage data collected and maintained at other geographic locations, to generate a global model that is learned based on a complete training dataset spread across different geographic locations. The global model can be generated without having to transmit, over a network, large amounts of training data (e.g., data instance of the feature set).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein provide a system that transmits and combines local models, that individually comprise a set of local parameters computed via stochastic gradient descent (SGD), into a global model that comprises a set of global model parameters. The local models are computed in parallel at different geographic locations along with symbolic representations. Network transmission of the local models and the symbolic representations, rather than transmission of the large training data subsets processed to compute the local models and symbolic representations, conserves resources and decreases latency. The global model can then be used as a model to determine a likelihood, given a new data instance of a feature set, that a user performs a computer interaction with the content element.

In one example, the system can use one or more models for a number of different content elements to provide search results in response to a search query submitted by a user. In another example, the system can use one or more models for a number of different content elements to make a recommendation or suggestion to a user in response to a request for content (e.g., display a targeted advertisement, suggest a news story, etc.). For instance, using the likelihoods computed by the model(s) as outputs, the system is configured to rank content elements to produce a set of ranked content elements. The system can then determine that a ranked position of an individual content element satisfies a ranking threshold, and can select the individual content element for display via a client computing device.

Various examples, implementations, scenarios, and aspects are described below with reference to FIGS. 1 through 8.

Figure 1:
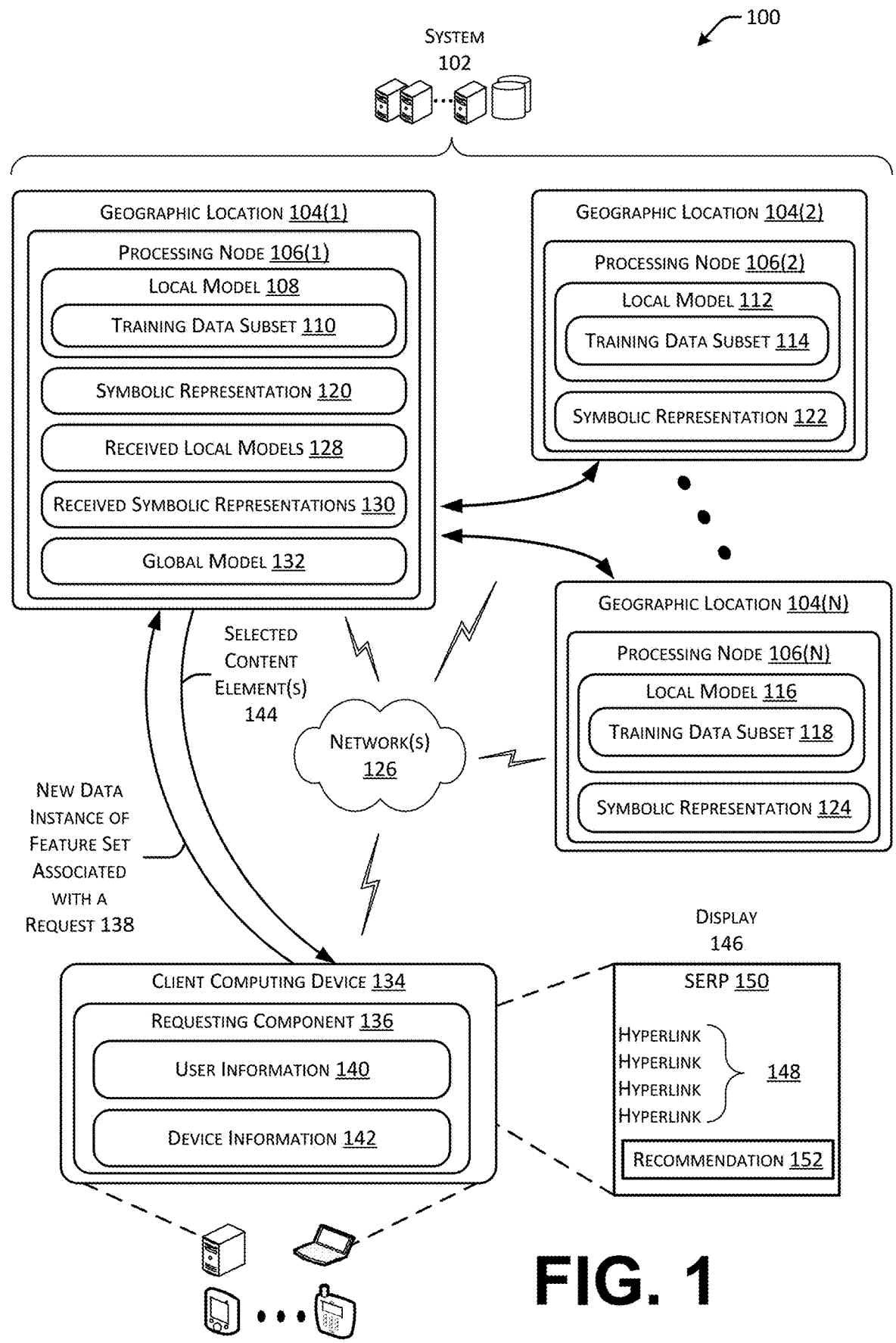
FIG. 1 is a diagram illustrating an example environment in which a system performs a parallel implementation of stochastic gradient descent (SGD) that processes a training dataset to compute parameters for a model that determines a likelihood that a user interacts with a content element.

FIG. 1 is a diagram illustrating an example environment 100 in which a system 102 performs a parallel implementation of stochastic gradient descent (SGD) that processes a training dataset to compute parameters for a model. As described above, the model is configured to compute a likelihood that a user interacts with a content element. The system can comprise one or more of a plurality of geographic locations 104(1) through 104(N) (where N is a positive integer number having a value of two or greater). As described above, in various examples, a geographic location can be or can comprise a datacenter. Thus, one or more entities operating the system 102 can have regionally located datacenters (e.g., a datacenter in the west of the United States, a datacenter in the south of the United States, a datacenter in the northeast of the United States, a datacenter in the Midwest of the United States, International datacenter(s) in different countries, etc.). A geographic location is configured to handle a request that is routed based on locality. That is, when the system 102 receives a request from a user and/or device on the west coast of the United States, then the system 102 can route the request to the geographic location located in the west of the United States (e.g., the routing based on locality reduces latency).

The models described herein can be configured for use in association with search and/or recommendation techniques. Thus, the system 102 can include resources (e.g., processing resources, storage resources, networking resources, etc.) that make up and support a search engine such as GOOGLE, SAFARI, FIREFOX, YAHOO!, BING, etc. The model can be used to predict a likelihood of a user interest in a content element to determine if and/or where the content element should be displayed on a search engine results page (SERP) in response to a search query submitted by the user. Prior to using the models to rank content elements, the content elements can initially be determined to be associated with the search query (e.g., keywords, search terms) submitted by the user.

The system 102 can also or alternatively include resources associated with a content and/or a service provider (e.g., social media provider, electronic mail provider, electronic commerce provider, etc.). In various examples, the model can be used to predict a likelihood of a user interest in a content element to determine if the content element should be displayed as a recommendation or a suggestion to a user in addition to content requested by the user. For instance, in association with a request to view a social media feed, an email inbox, and/or an e-commerce page, the system 102 can select a content element and place the content element as a recommendation or a suggestion amongst the requested content.

The geographic locations 104(1) through 104(N) include corresponding processing nodes 106(1) through 106(N). A processing node can comprise one or more of a device (e.g., a server), a processing core, a machine, and/or other processing resources useable to process training data to compute parameters for a model, as well as memory and/or networking resources configured to store, transmit, and/or receive data useable to generate the model. As further described herein, each processing node 106(1) through 106(N) is configured to compute a local model based on a training data subset. As illustrated, processing node 106(1) computes local model 108 by processing training data instances in training data subset 110. Processing node 106(2) computes local model 112 by processing training data instances in training data subset 114. Processing node 106(N) computes local model 116 by processing training data instances in training data subset 118. The illustrated training data subsets 110, 114, 118 together comprise a whole training dataset that is spread across multiple geographic locations 104(1) through 104(N). Moreover, the training data subsets 110, 114, 118 individually comprise data that is local to a geographic location (e.g., data instances of a feature set that are locally routed and stored). Since each geographic location 104(1) through 104(N) receives, stores, and processes a different training data subset 110, 114, 118, then the local models 108, 112, 116 computed via SGD in parallel likely include different sets of local model parameters.

To compute the local models 108, 112, 116, the processing nodes 106(1) through 106(N) each start with a same initial state (e.g., a same set of starting parameters for the model). As further described herein, the processing nodes 106(1) through 106(N) are each configured to also compute a symbolic representation. A symbolic representation represents how an adjustment (e.g., a change, a shift, etc.) to the set of starting model parameters mathematically affects the set of local model parameters computed for a corresponding local model. The adjustment is an unknown adjustment at a time a symbolic representation is computed. As illustrated, processing node 106(1) computes symbolic representation 120. Processing node 106(2) computes symbolic representation 122. Processing node 106(N) computes symbolic representation 124.

In FIG. 1, processing nodes 106(2) through 106(N) associated with geographic locations 104(2) through 104(N) are configured to send, via network(s) 126, their local models 112, 116 and their symbolic representations 122, 124 to processing node 106(1) associated with geographic location 104(1). Thus, processing node 106(1) receives the local models 112, 116 and can store them as received local models 128 to go with its own local model 108. Moreover, processing node 106(1) receives the symbolic representations 122, 124 and can store them as received symbolic representations 130 to go with its own local symbolic representation 120. Consequently, the processing node 106(1) can combine the received local models 128 and its own local model 108, using the received symbolic representations 130 and/or its own local symbolic representation 120, to generate a global model 132 with a global set of parameters.

In various examples, processing node 106(1) is designated as the processing node to which processing nodes 106(2) through 106(N) send the local models 112, 116 and the symbolic representations 122, 124. Upon combining the local models 108, 112, 116 into a global model 132 using at least some of the symbolic representations 120, 122, 124, the processing node 106(1) can distribute the global model 132 to the other processing nodes 106(2) through 106(N) so the other geographic locations 104(2) through 104(N) can also use the more complete and more robust global model 132 computed based on a larger amount of data (e.g., compared to a local model) to determine a likelihood that a user interacts with a content element. Once distributed, the global model 132 can then become a local model that is used to determine the likelihood of an outcome and the local model can begin to be updated at an individual geographic location based on new data instances receives. Accordingly, subsequent iterations of computing and transmitting local models and symbolic representations to generate an updated global model can be performed (e.g., the system is always learning). As further described herein, iterations of generating a global model can be performed in accordance with a schedule that can be established by the system 102 to ensure that a variance associated with matrix projection is less than a threshold variance.

In some examples, a processing node designated to receive local models and symbolic representations may be an independent processing node (e.g., an independent location) that does not have its own local model and symbolic representation. In other examples, each processing node 106(1) through 106(N) can send its local model and symbolic representation to each of the other processing nodes such that each processing node 106(1) through 106(N) receives local models and symbolic representations and each processing node 106(1) through 106(N) can compute its own global model based on combining the local models.

FIG. 1 further illustrates a client computing device 134. The client computing device 134 includes a requesting component 136 (e.g., an operating system, a web browser, an application such as a social media application, an email client, etc.) that can generate and/or submit a new data instance of at least part of a feature set associated with a request 138 (e.g., a search query, a request for content, etc.). As described above, the feature set can comprise features related to user information 140 and/or device information 142, examples of which can include an age or age range, gender (e.g., male, female, etc.), education, profession, annual income, city and state of residence, home address (e.g., a zip code), phone number (e.g., an area code), citizenship, languages spoken, user interests (e.g., activities, hobbies, etc.), health information, a time of day a request is submitted, current geographic location (e.g., an IP address), recent device use history (e.g., search history, browsing history, application usage history, etc.), or any other user and/or device information that may be stored and/or shared, and that may help a model predict content elements that may be more pertinent to a user. Upon receiving the request, and given the new data instance of the feature set, the geographic location 104(1) can use the global model 132 (which upon generation and/or distribution becomes the local model 108) to compute a likelihood that a user performs a computer interaction with a content element. A component (e.g., a device) of the geographic location 104(1) can use the likelihood to select content element(s) 144 to be displayed via a display 146 associated with the client computing device 134. For example, the selected content element(s) 144 can comprise an ordered set of hyperlinks 148 to be displayed as part of a search engine results page (SERP) 150 and/or a recommendation 152 (e.g., an advertisement, suggested Web content, etc.).

In various examples, the system 102 and/or the geographic locations 104(1) through 104(N) includes device(s) (e.g., as part of a datacenter). The device(s) and/or other components of the system 102 can include distributed computing resources that communicate with one another and/or with the client computing device 134 via the one or more network(s) 126. Network(s) 126 may include, for example, public networks such as the Internet, private networks such as an institutional and/or personal intranet, or some combination of private and public networks. Network(s) 126 may also include any type of wired and/or wireless network, including but not limited to local area networks ("LANs"), wide area networks ("WANs"), storage area networks ("SANs"), satellite networks, cable networks, Wi-Fi networks, WiMax networks, mobile communications networks (e.g., 3G, 4G, and so forth) or any combination thereof. Network(s) 126 may utilize communications protocols, including packet-based and/or datagram-based protocols such as Internet protocol ("IP"), transmission control protocol ("TCP"), user datagram protocol ("UDP"), or other types of protocols. Moreover, network(s) 126 may also include a number of devices that facilitate network communications and/or form a hardware basis for the networks, such as switches, routers, gateways, access points, firewalls, base stations, repeaters, backbone devices, and the like. In some examples, network(s) 126 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, the device(s) may include one or more computing devices that operate in a cluster or other grouped configuration to share resources, balance load, increase performance, provide fail-over support or redundancy, or for other purposes. For instance, device(s) may belong to a variety of classes of devices such as traditional server-type devices. Thus, devices of the system 102 may include a diverse variety of device types and are not limited to a particular type of device. Device(s) may represent, but are not limited to, server computers, desktop computers, web-server computers, file-server computers, personal computers, mobile computers, laptop computers, tablet computers, or any other sort of computing device.

A client computing device 134 may belong to a variety of classes of devices, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. The client computing device 134 of the various classes and device types can represent any type of computing device having one or more processing unit(s) operably connected to computer-readable media such as via a bus, which in some instances can include one or more of a system bus, a data bus, an address bus, a PCI bus, a Mini-PCI bus, and any variety of local, peripheral, and/or independent buses. Executable instructions stored on computer-readable media may include, for example, an operating system, a client module, a profile module, and other modules, programs, or applications that are loadable and executable by processing units(s). The client computing device 134 may also include one or more interface(s) to enable communications between client computing device 134 and other networked devices, such as those configured at geographic locations 104(1) through 104(N), over network(s) 126. Such network interface(s) may include one or more network interface controllers (NICs) or other types of transceiver devices to send and receive communications and/or data over a network. Moreover, client computing device 134 can include input/output ("I/O") interfaces that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display 146, a printer, audio speakers, a haptic output device, and the like).

Figure 2:
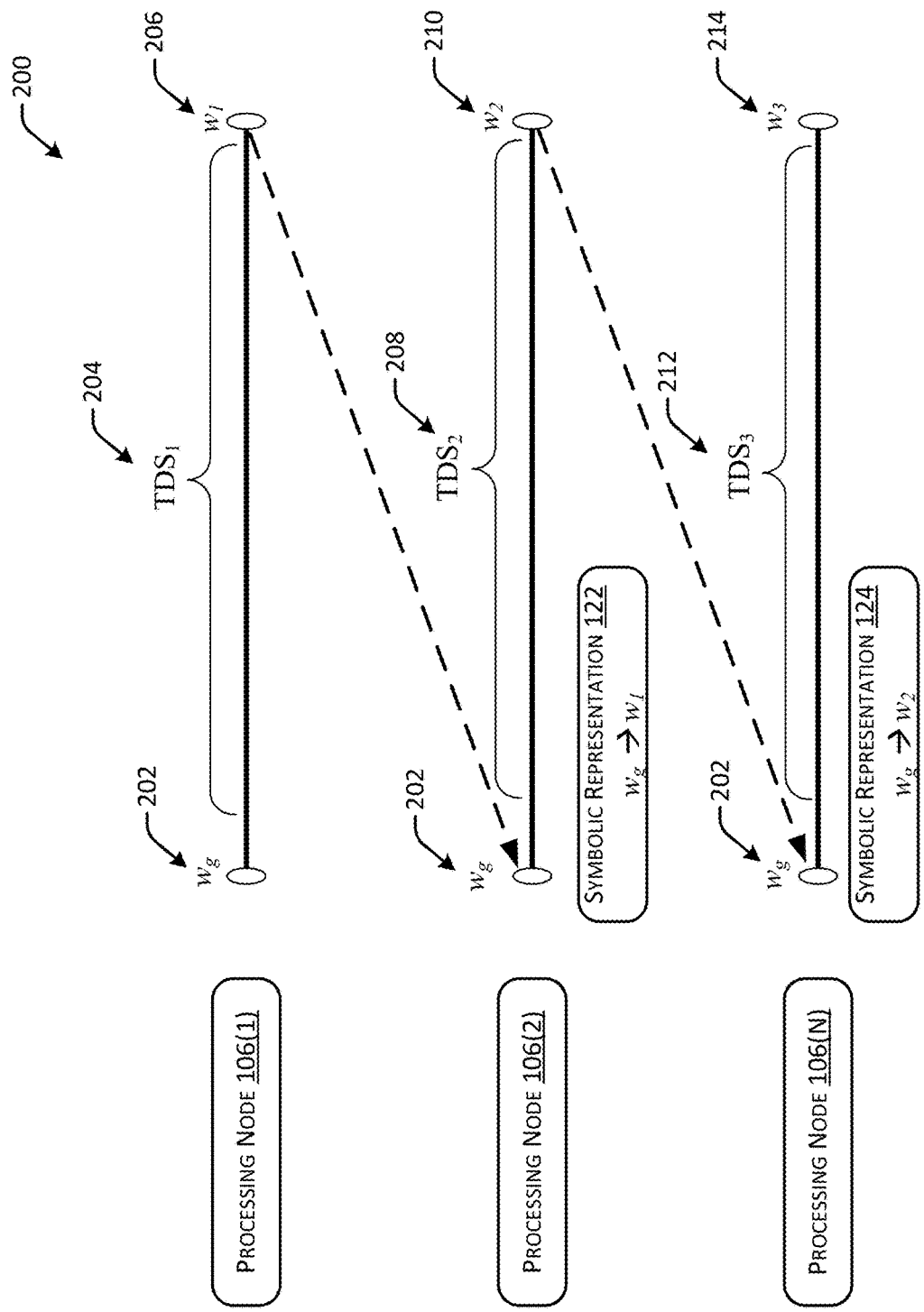
FIG. 2 is a diagram illustrating an example of how a symbolic representation can be used to adjust the set of local model parameters computed for an individual local model.

FIG. 2 is a diagram 200 illustrating an example of how a symbolic representation can be used to adjust the set of local model parameters computed for an individual local model.

As illustrated, each of processing nodes 106(1) through 106(N) starts its parallel computation of parameters for a local model with the same initial state (e.g., a starting set of parameters—$w_g$ 202 in the example of FIG. 2). For ease of discussion, N=3 in the example of FIG. 2, although the number of processing nodes and/or models to be combined can be large (e.g., tens, hundreds, thousands, even millions). Processing node 106(1) processes data instances of its training data subset 110 (e.g., represented as $TDS_1$ 204 in the example of FIG. 2) to compute a first set of parameters, $w_1$ 206, for local model 108. Processing node 106(2) processes data instances of its training data subset 114 (e.g., represented as $TDS_2$ 208 in the example of FIG. 2) to compute a second set of parameters, $w_2$ 210, for local model 112. And processing node 106(N) processes data instances of its training data subset 118 (e.g., represented as $TDS_3$ 212 in the example of FIG. 2) to compute a third set of parameters, $w_3$ 214, for local model 116.

Looking at the second processing node 106(2), computation starts at $w_g$ 202 while, in a sequential implementation of SGD that processes the training dataset based on the following order—$TDS_1$ 204, $TDS_2$ 208, and $TDS_3$ 212, the second processing node 106(2) should have started its computation at $w_1$ 206 (e.g., the output or the parameters computed by the first processing node 106(1)). Moreover, looking at the third processing node 106(N), computation starts at $w_g$ 202 while, in a sequential implementation of SGD, the third processing node 106(N) should have started its computation at $w_2$ 210 (e.g., the output or the parameters computed by the second processing node 106(2)).

To obtain sequential semantics, a symbolic representation is computed to represent how an adjustment to the set of starting model parameters, $w_g$ 202, affects the set of model parameters computed (e.g., $w_2$ 210 and $w_3$ 214). For example, at the combination stage, symbolic representation 122 is used to adjust, or shift, the starting point of the computation by the second processing node 106(2) from $w_g$ 202 to $w_1$ 206, as represented by the dashed line from $w_1$ 206 to $w_g$ 202 (e.g., the adjustment can be represented by $w_g + \Delta w$), where $\Delta w$ is the symbolic representation or an unknown symbolic vector). Based on the use of the symbolic representation 122, the output W2210 can be updated to accurately reflect parameters that would have been computed via a sequential implementation of SGD. Similarly, symbolic representation 124 is configured to adjust, or shift, the starting point of the computation by the third processing node 106(N) from $w_g$ 202 to $w_2$ 210 (e.g., the updated parameters), as represented by the dashed line from $w_2$ 210 to $w_g$ 202. Thus, based on the use of the symbolic representation 124, the output $w_3$ 214 can be updated to accurately reflect parameters that would have been computed via a sequential implementation of SGD.

Consequently, via the use of the symbolic representations, a set of global model parameters determined via a combination of local models computed in parallel are essentially the same as a corresponding set of model parameters that would have been computed had the whole training dataset (e.g., the local models and their training data subsets) been computed sequentially via SGD at one processing node, rather than in parallel. In various examples, the order in which the local models are combined using the symbolic representations (e.g., the order in which the symbolic representations are applied) generates a set of global parameters that are essentially the same as a corresponding set of parameters that would have been computed had the local models and their corresponding training data subsets been computed sequentially via SGD in the same order. Stated another way, a symbolic representation associated with a local model enables the set of starting parameters to shift to a known set of starting model parameters associated with an output of another local model, the output comprising the set of local model parameters computed for the other local model. By using the symbolic representations, the combination of a plurality of local models, computed in parallel, into a global model honors the sequential dependencies of SGD. This parallelization approach can be applied when the update to the model parameters is linear in a SGD computation.

Based on the description above, one symbolic representation associated with the local model that is first in the order of combination may not be needed since the local model is not dependent on the output of a previous local model (e.g., the local model actually starts with the initial state—the starting model parameters). Therefore, no adjustment of the starting model parameters is needed. In FIG. 1, for example, local model 108 can be the first local model in the order of combination, and thus, symbolic representation 120 may not be used, or even computed.

Previous approaches directed to parallelizing SGD, such as HOGWILD! and ALLREDUCE, attempt to process a large training dataset (e.g., thousands of data instances, millions of data instances, etc.) to compute parameters for a model. However, these previous approaches do not honor the sequential dependencies of SGD described above, and thus, the previous approaches have poor convergence rates and/or poor scalability. For example, the previous approaches combine models in an ad-hoc manner without accounting for the adjustment represented by a symbolic representation described herein. Consequently, these previous approaches directed to parallelization of SGD compute model parameters based on a training dataset that are vastly different from model parameters that would have been computed via a sequential implementation of SGD based on the same training dataset.

Figure 3:
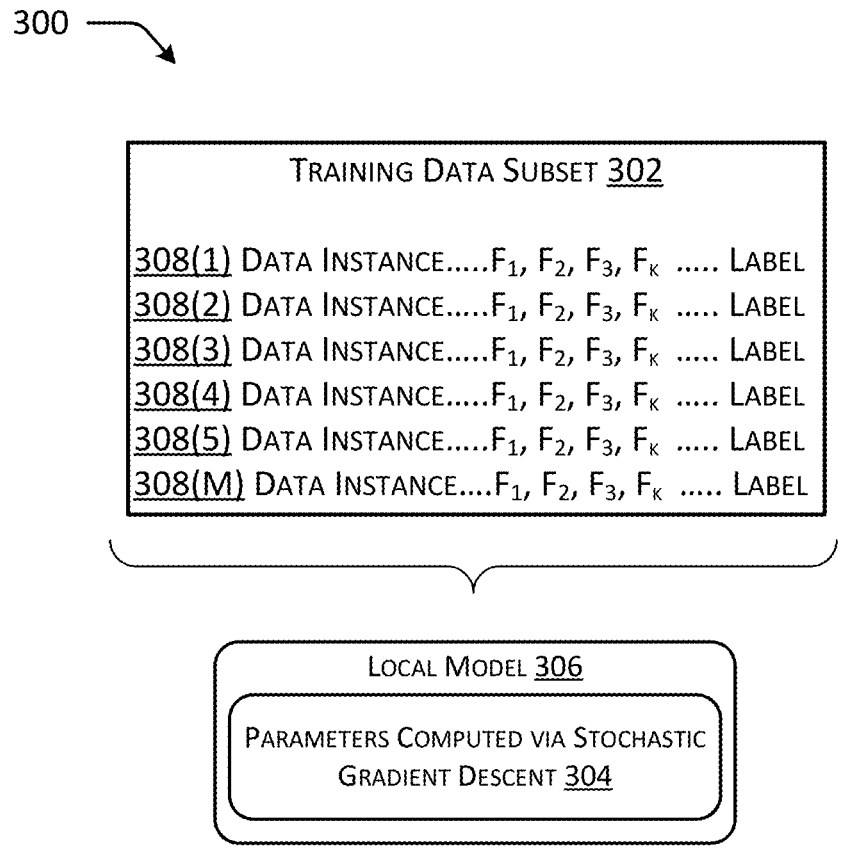
FIG. 3 is a diagram illustrating an example of a training data subset used to compute parameters of a local model, the training data subset including data instances of a feature set and a label.

FIG. 3 is a diagram 300 illustrating an example of a training data subset 302 (e.g., one of training data subsets 110, 114, 118) used to compute parameters 304 of a local model 306 (e.g., one of local models 108, 112, 116) via SGD. The training data subset 302 includes data instances 308(1) through 308(M) (where M is a positive integer number having a value of two or greater but likely is very large—thousands, millions, or even billions of data instances). In this example, an individual data instance 308(1) through 308(M) includes values (e.g., training data) for a feature set comprised of individual features $F_1$, $F_2$, $F_3$, ... $F_k$, as well as a label indicating whether an outcome is true or false (e.g., occurs or not).

The feature set can be defined by the system 102 for search (e.g., for a search engine) and/or for recommendations (e.g., suggesting content such as an advertisement, a news story, a product or item, etc.). Thus, the feature set can include individual features, values for which are collected. The features can be related to user information and/or device information, and therefore can include an age or age range, gender (e.g., male, female, etc.), education, profession, annual income, city and state of residence, home address (e.g., a zip code), phone number (e.g., an area code), citizenship, languages spoken, user interests (e.g., activities, hobbies, etc.), health information, a time of day a request is submitted, current geographic location (e.g., an IP address), recent device use history (e.g., search history, browsing history, application usage history, etc.), or any other user and/or device information that may be stored and/or shared, and that may help a model predict content elements that may be more pertinent to a user. The information can be part of a received user profile (e.g., in an event the user is logged into an account). Consequently, the number of features k, values of which are collected for a data instance, can be large (e.g., hundreds, thousands, millions, even billions, etc.).

Figure 4:
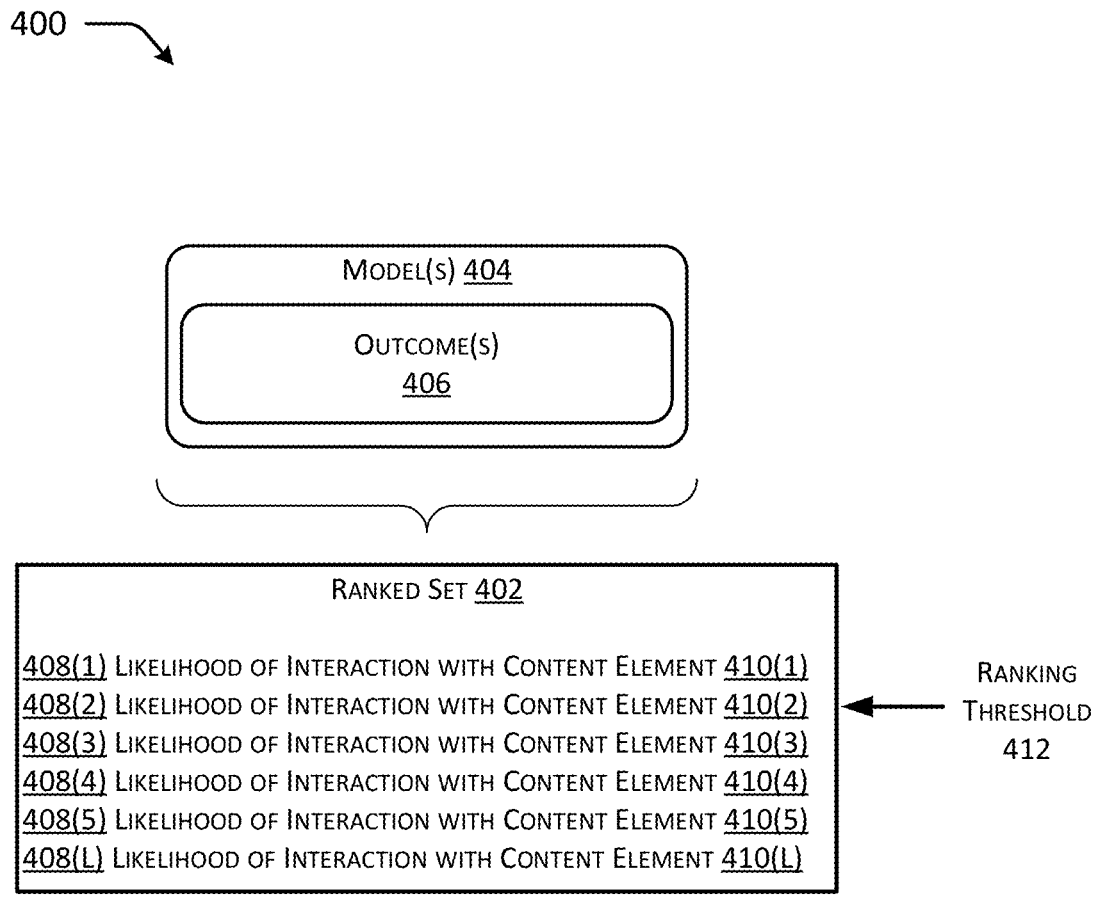
FIG. 4 is a diagram illustrating an example of a ranked set of likelihoods computed by one or more model(s), as well as a ranking threshold used to select a content element to be displayed via a client computing device in response to a request (e.g., a search query, a request for content, etc.).

FIG. 4 is a diagram 400 illustrating an example of a ranked set 402 (e.g., a list) of likelihoods determined by one or more model(s) 404 (e.g., global model 132). An individual model 404 is associated with an outcome 406, and given a new data instance provided as input to the model 404, the model 404 can provide an output. In this example, the output includes a likelihood that the outcome 406 occurs. In a more specific example, the outcome is associated whether a user performs a computer interaction with a content element displayed on a display screen.

Therefore, the ranked set 402 includes individual likelihoods 408(1) through 408(L) that a user interacts with different content elements 410(1) through 410(L) associated with the model(s) 404 (where L is a positive integer number having a value of two or greater). The ranked set 402 reflects content elements that the user is more likely to interact with (e.g., the list includes the higher likelihoods at the top). Accordingly, FIG. 4 also illustrates a ranking threshold 412, which can be used by the system 102 (e.g., a search and/or recommendation system) to select a content element to be displayed via the client computing device 134 in response to a request (e.g., a search query, a request for content, etc.). In various examples, a position of a content element in the ranked set 402 satisfies the ranking threshold 412 if it is positioned above the ranking threshold 412. The ranking threshold 412 can be set based on a number of opportunities to display content elements (e.g., a number of available spots for hyperlinks on a SERP, a number of available placements for an advertisement, etc.). As shown in FIG. 4, content elements 410(1) and 410(2) are the highest ranked content elements (e.g., highest likelihoods 408(1) and 408(2)), and therefore, satisfy the ranking threshold 412.

Figure 5:
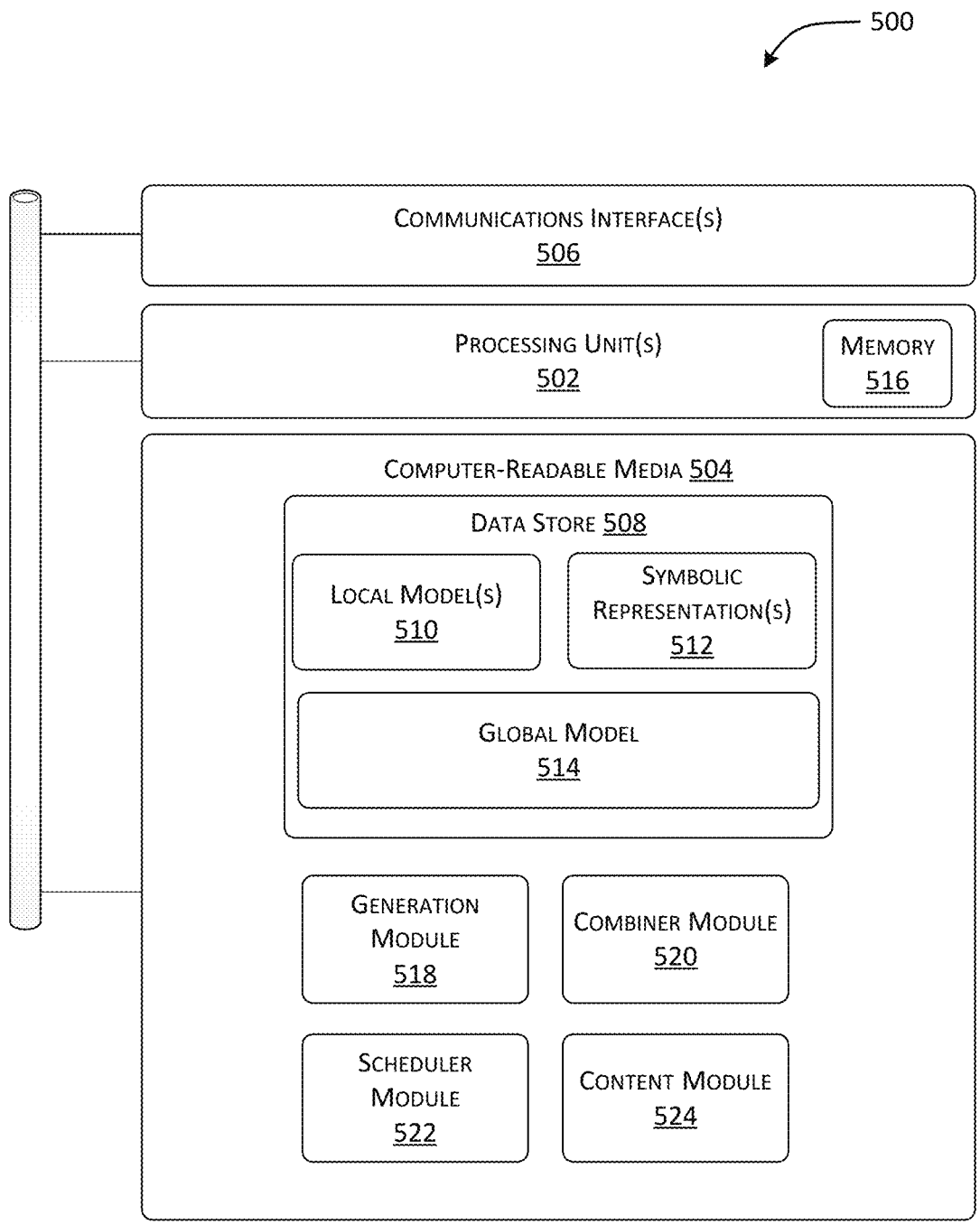
FIG. 5 is a diagram illustrating an example components of an example processing node (e.g., a device) configured to combine local models into a global model using symbolic representations.

FIG. 5 is a diagram illustrating example components of an example processing node 500 (e.g., a device) configured to combine local models into a global model using symbolic representations. The processing node 500 may be configured to operate at a geographic location 104(1) that is part of the system 102. The processing node 500 includes one or more processing unit(s) 502, computer-readable media 504, and/or communication interface(s) 506. The components of the processing node 500 can be operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as processing unit(s) 502, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 504, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 506 may represent, for example, network interface controllers ("NICs") or other types of transceiver devices to send and receive communications over a network.

In the illustrated example, computer-readable media 504 includes a data store 508. In some examples, data store 508 includes data storage such as a database, data warehouse, or other type of structured or unstructured data storage. The data store 508 may store data for the operations of processes, applications, components, and/or modules stored in computer-readable media 504 and/or executed by processing unit(s) 502. For instance, the data store 508 can include local models 510 (e.g., local model 108 and received local models 128), symbolic representations 512 (e.g., symbolic representation 120 and/or received symbolic representations 130), and a global model 514 (e.g., global model 132).

Alternately, some or all of the above-referenced data can be stored on separate memories 516 on board one or more processing unit(s) 502 such as a memory on board a CPU-type processor, a GPU-type processor, an FPGA-type accelerator, a DSP-type accelerator, and/or another accelerator.

The computer-readable media 504 also includes one or more modules such as a generation module 518, a combiner module 520, a scheduler module 522, and a content module 524, although the number of illustrated modules is just an example, and the number may vary higher or lower. That is, functionality described herein in association with the illustrated modules may be performed by a fewer number of modules or a larger number of modules on one device or spread across multiple devices.

The generation module 518 is configured to compute, via SGD, a local model that comprises a set of local model parameters based on a training data subset that includes data instances of a feature set and a label indicating whether a user interaction with a content element occurs. The generation module 518 is further configured to compute a symbolic representation associated with the local model. As described above, the symbolic representation represents how an adjustment to the set of starting model parameters affects the set of local model parameters computed for the local model. The symbolic representation comprises a matrix. In various examples, the generation module 518 is further configured to reduce a dimension of the matrix from a first dimensional space to a second dimensional space of smaller dimension (e.g., prior to transmitting the symbolic representation to other processing nodes). This reduces a size (e.g., an amount of data) of the matrix and also reduces an amount of time it takes to perform computation when the matrix is used to combine local models. The second dimensional space can be generated on random bases. In one example further described herein, reducing the dimension of the matrix comprises removal of an identity matrix from the matrix, where the identity matrix includes a diagonal entry.

The combiner module 520 is configured to combine the local models 510 to generate a global model 514. To do so, the combiner module 520 uses the symbolic representations 512 associated with the local models 512 to be combined (e.g., except the local model 510 that is first in the combination order). In some examples, upon generation, the combiner module 520 distributes the global model 514 to other processing nodes.

The scheduler module 522 determines a schedule for transmitting or exchanging local models 510 and symbolic representations 512 amongst processing nodes so that the global model 514 can be generated. In various examples, the schedule can be established to ensure that a variance associated with projecting the matrix from the first dimensional space to the second dimensional space is less than a threshold variance.

The content module 524 is configured to select a content element to be displayed to a user via a display associated with a client computing device. That is, given a new data instance of the feature set (e.g., an unlabeled data instance) that is associated with a request (e.g., a search query, a request to view an email inbox, a request to view a social media feed, etc.), the content module 524 uses a model (e.g., the global model 514) to determine a likelihood of a user interaction with the content element. The content module 524 is configured to rank the content element amongst other content elements using the determined likelihood to produce a set of ranked content elements. Furthermore, the selection of the content element can be based on a determination that a ranked position of the content element in the set of ranked content elements satisfies a ranking threshold.

The generation module 518 is configured to generate a local model and a symbolic representation and/or the combiner module 520 is configured to combine the local models based on the following discussion. Given a training dataset $(X_{n \times f}, y_{n \times 1})$, where f is the number of features in a feature set, n is the number of data instances in the training dataset, the $i^{th}$ row of matrix X, $X_i$, represents the features of the $i^{th}$ data instance, and $y_i$ is the dependent value (e.g., the label) of that data instance, a linear model seeks to find a set of parameters w* that minimizes an error function Q as follows in equation (1):

$$w^* = \arg\min_{w \in \mathbb{R}^f} \sum_{i=0}^{n} Q(X_i \cdot w, y_i) \qquad \text{equ. (1)}$$

The parameters (w*) for the model computed via SGD may be referred to as weights, and the weights can be generated for individual features in the feature set such that updating an individual parameter in the model may adjust how much an individual feature in the feature set contributes to determining the likelihood of the outcome. For linear regression, $Q(X_i \cdot w, y_i) = (X_i \cdot w - y_i)^2$. When $(X_i, y_i)$ is evident from the context, the error function can be referred to as $Q_i(w)$. SGD can iteratively find w* by updating the current model w with a gradient of $Q_r(w)$ for a randomly selected data instance r.

For the linear regression error function above (e.g., equation (1)), this amounts to the update as follows in equation (2):

$$w_i = w_{i-1} - \Delta \nabla Q_r(w_{i-1}) = w_{i-1} - \alpha(X_r \cdot w_{i-1} - y_r) X_r^T \qquad \text{equ. (2)}$$

Here, $\alpha$ is the learning rate that determines a magnitude of the update along the gradient. As shown in equation (2), $w_i$ is dependent on $w_{i-1}$, which creates a loop-carried dependence and consequently makes parallelization of SGD difficult.

The techniques described herein describe a parallelization approach to SGD that honors the aforementioned loop-carried dependencies. As described above, each processing node 106(1) through 106(N) begins computation of local model parameters for a local model with the same initial state (e.g., the same set of starting model parameters w) along with a symbolic unknown $\Delta w$ that captures the realization that the starting model parameters used to begin the computation can change based on an output of another processing node (e.g., the model parameters computed by a previous processing node). If the dependence on $\Delta w$ is linear during an SGD update, which is the case for linear regression, then the symbolic dependence on $\Delta w$ to produce a final output can be captured by a matrix $M_{a \to b}$ that is a function of the input data instances $X_a, \ldots, X_b$ processed (e.g., $y_a, \ldots, y_b$ do not affect this matrix). This matrix, as follows in equation (3), is the symbolic representation that can be used to combine local models:

$$M_{a \to b} = \prod_{i=b}^{a} (I - \alpha X_i^T \cdot X_i) \qquad \text{equ. (3)}$$

The symbolic representation in equation (3) above, which may also be referred to as a "combiner" matrix herein, represents how a change in the input to a local model will affect the output. $M_{a \to b}$ can be referred to by M when the inputs are not evident.

Accordingly, in a learning phase, each processing node i (e.g., each processing node 106(1) through 106(N)) starting from $w_0$ (e.g., the starting model parameters) computes both a local model $l_i$ and a combiner matrix $M_i$. Then, in a reduction phase, an individual processing node i can compute a true output using equation (4) as follows:

$$w_i = l_i + M_i \cdot (w_{i-1} - w_0) \qquad \text{equ. (4)}$$

Lemma (1), as provided herein, ensures that the combination (e.g., in a particular combination order) of local models, which have been computed in parallel based on training data subsets (e.g., by different processing nodes 106(1) through 106(N) at different geographic locations 104(1) through 104(N)), essentially produces the same output had the whole training dataset been computed sequentially (e.g., at a single processing node at a single geographic location). As described above, such parallelization enables conservation of resources because the training dataset does not have to be transmitted to, or collected at, a single location.

Lemma (1) provides, that if the SGD algorithm for linear regression processes data instances $(X_a, y_a), (X_{a+1}, y_{a+1}), \ldots, (X_b, y_b)$ starting from model $w_s$ to obtain $w_b$, then its outcome starting on model $w_s + \Delta w$ is given by $w_b + M_{a \to b} \cdot \Delta w$), where the combiner matrix $M_{a \to b}$ is given by equation (3). The proof follows from an induction. For example, starting from $w_s$, let the models computed by SGD after processing $(X_a, y_a), (X_{a+1}, y_{a+1}), \ldots, (X_b, y_b)$ respectively be $w_a, w_{a+1}, \ldots, w_b$. Consider a case of processing of $(X_a, y_a)$. Starting from $w_s + \Delta w$, SGD computes the model $w'_a$ using equation (2) (e.g., $w_i = w_{i-1} - \alpha(X_i \cdot w_{i-1} - y_i) X_i^T$) as follows:

$$w'_a = w_s + \Delta w - \alpha(X_a \cdot (w_s + \Delta w) - y_a) X_a^T \qquad \text{equ (5)}$$

$$w'_a = w_s + \Delta w - \alpha(X_a \cdot w_s - y_a) X_a^T - \alpha(X_a \cdot \Delta w) X_a^T \qquad \text{equ. (6)}$$

$$w'_a = w_s \cdot \alpha(X_a \cdot w_s - y_a) X_a^T + \Delta w - \alpha(X_a \cdot \Delta w) X_a^T \qquad \text{equ. (7)}$$

$$w'_a = w_a + \Delta w - \alpha(X_a \cdot \Delta w) X_a^T \qquad \text{equ. (8)}$$

$$w'_a = w_a + \Delta w - \alpha X_a^T (X_a \cdot \Delta w) \qquad \text{equ. (9)}$$

$$w'_a = w_a + \Delta w - \alpha(X_a^T \cdot X_a) \cdot \Delta w \qquad \text{equ. (10)}$$

$$w'_a = w_a + (I - \alpha X_a^T \cdot X_a) \cdot \Delta w \qquad \text{equ. (11)}$$

Equation (8) uses equation (2), equation (9) uses the fact that $X_a \cdot \Delta w$ is a scalar (e.g., allowing it to be rearranged), and equation (10) follows from the associativity property of matrix multiplication. The induction is similar and follows from replacing $\Delta w$ with $M_{a \to i-1} \Delta w$ and the property that:

$$M_{a \to i} = (I - \alpha X_i^T \cdot X_i) \cdot M_{a \to i-1} \qquad \text{equ. (12)}$$

Thus, the symbolic representation (e.g., a combiner matrix) can be generated and used by the combiner module 520 to combine local models.

In some instances, the combiner matrix M generated above can be quite large and expensive to compute. Sequential SGD maintains and updates a weight vector w, and thus requires $O(f^2)$ space and time, where f is the number of features in a feature set. In contrast, the combiner matrix M is a f matrix and consequently, the space and time complexity of parallel SGD is $O(f^2)$. To resolve this, a processing node is configured to project M into a smaller space while maintaining its fidelity, as provided via Lemma (2). That is, a set of vectors can be projected from a high-dimensional space to a random low-dimensional space while preserving distances. This property reduces a size of the combiner matrix without losing the fidelity of the computation. The projection can occur before the local model and/or symbolic representation is transmitted to other processing nodes.

Lemma (2)—Let A be a random f×k matrix with:

$$a_{ij} = d_{ij}/\sqrt{k} \qquad \text{equ. (13)}$$

Here, $a_{ij}$ is the element of A at the $i^{th}$ row and $j^{th}$ column, and $d_{ij}$ is independently sampled from a random distribution D with E[D]=0 and Var[D]=1. Then:

$$E[A \cdot A^T] = I_{f \times f} \qquad \text{equ. (14)}$$

Proof of Lemma (2)—Let $B = A \cdot A^T$. Then $b_{ij}$, the element of B at row i and column j, is $\Sigma_s a_{is} a_{js}$. Therefore:

$$E[b_{ij}] = \qquad \text{equ. (15)}$$

$$\sum_{s=1}^{k} E[a_{is} \ a_{js}] = \left(\frac{1}{\sqrt{k}}\right)^2 \sum_{s=1}^{k} E[d_{is} \ d_{js}] = \frac{1}{k} \sum_{s=1}^{k} E[d_{is} \ d_{js}]$$

Because $d_{ij}$ are chosen independently, for $i \neq j$:

$$E[b_{ij}] = \frac{1}{k} \sum_{s=1}^{k} E[d_{is}] E[d_{js}] \qquad \text{equ. (16)}$$

Since E[D]=0 and $d_{is}, d_{js} \in D$, $E[d_{is}] = E[d_{js}] = 0$ and consequently, $E[b_{ij}] = 0$.

For i=j:

$$E[b_{ii}] = \frac{1}{k} \sum_s E[d_{is}] E[d_{is}] = \frac{1}{k} \sum_s E[d_{is}^2] \qquad \text{equ. (17)}$$

Since $E[D^2] = 1$ and $d_{is} \in D, E[d_{is}^2] = 1$. As a result:

$$E[b_{ii}] = \frac{1}{k} \sum_{s=1}^{k} E[d_{is}^2] = \frac{1}{k} \sum_{s=1}^{k} 1 = 1 \qquad \text{equ. (18)}$$

The matrix A from Lemma (2) projects from $\mathbb{R}^f \to \mathbb{R}^k$, where k can be much smaller than f. This allows us to approximate equation (4) as follows:

$$w_i \approx l_i + M_i \cdot A \cdot A^T (w_{i-1} - w_0) \qquad \text{equ. (19)}$$

Lemma (2) essentially guarantees that the approximation above is unbiased, as follows:

$$E[l_i + M_i \cdot A \cdot A^T (w_{i-1} - w_0)] = l_i + M_i \cdot E[A \cdot A^T](w_{i-1} - w_0) = w_i \qquad \text{equ. (20)}$$

Consequently, an efficient algorithm that only computes the projected version of the combiner matrix while still producing the same answer as the sequential algorithm in expectation can be used. Such combiners may be referred to as "probabilistically" sound.

Example Algorithm (1), provided herein, shows how a local model and a corresponding symbolic representation can be generated.

| | Example Algorithm (1) |
|---|---|
| 1 | <vector,matrix,matrix> SymSGD( |
| 2 | float α, vector: $w_0, X_1 \ldots X_n$, |
| 3 | scalar: $y_1 \ldots y_n$) { |
| 4 | vector $w = w_0$; |
| 5 | matrix $A = \frac{1}{\sqrt{k}}$ random(D, f, k); |
| 6 | matrix $M_A = A$; |
| 7 | for i in (1 ... n) { |
| 8 | $w = w - \alpha(X_i \cdot w - y_i) X_i^T$; |
| 9 | $M_A = M_A - \alpha \cdot X_i \cdot (X_i^T M_A);$} |
| 10 | return <w, $M_A$, A>;} |

The random function in line 5 of Example Algorithm (1) returns a f×k matrix with elements chosen independently from the random distribution D according to Lemma (2). When compared to the sequential SGD, the additional work is associated with the computation of $M_A$ in line 9 of Example Algorithm (1). Example Algorithm (1) maintains the invariant that $M_A = M \cdot A$ at each step. This projection incurs a space and time overhead of O(f×k), which is acceptable.

Example Algorithm (2) combines the resulting probabilistically sound combiners, in addition to performing further computations discussed below.

| | Example Algorithm (2) |
|---|---|
| 1 | vector SymSGDCombine(vector $w_0$, |
| 2 | vector w, vector 1, |
| 3 | matrix $M_A$, matrix A) { |
| 4 | parallel { |
| 5 | matrix $N_A = M_A - A$; |
| 6 | $w = 1 + w - w_0 + N_A \cdot A^T(w - w_0)$; |
| 7 | } |
| 8 | return w; } |

A randomized SGD algorithm that generates an exact result in expectation can be associated with keeping the resulting variance small enough to maintain accuracy and the rate of convergence. A combiner matrix having small singular values can result in a small variance. The combiner matrix resulting from SGD described herein is dominated by the diagonal entries as the learning rate is small for effective learning. This property can be used to perform the projection after subtracting the identity matrix. Other factors that control the singular values are the learning rate, a number of processing nodes, and the frequency of combining local models (e.g., the schedule).

Consider the approximation of $M \cdot \Delta w$ with $v = M \cdot A \cdot A^T \cdot \Delta w$. Let $\mathbb{C}(v)$ be the covariance matrix of v. The trace of the covariance matrix $tr((\mathbb{C}(v))$ is the sum of the variance of individual elements of v. Let $\lambda_i(M)$ by the $i^{th}$ eigenvalue of M and $\sigma_i(M) = \sqrt{\lambda_i M^T M}$ the $i^{th}$ singular value of M. Let $\sigma_{max}(M)$ be the maximum singular value of M. Then the following holds:

$$\frac{\|\Delta w\|_2^2}{k} = \qquad \text{equ. (21)}$$

$$\sum_i \sigma_i^2(M) \leq tr(\mathbb{C}(v)) \leq \frac{\|\Delta w\|_2^2}{k} \left( \sum_i \sigma_i^2(M) + \sigma_{max}^2(M) \right)$$

The covariance is small if k, the dimension of the projected space, is large. But increasing k proportionally can increase the overhead of the parallel algorithm. Similarly, covariance is small if the projection happens on small $\Delta w$. Looking at equation (19), this means that $w_{i-1}$ should be as close to $w_0$ as possible, implying that the processing nodes should communicate frequently enough such that their models are roughly in sync.

Further, the singular values of M should be as small as possible in some examples, and thus, the identity matrix can be removed (e.g., subtracted, taken off, etc.). Expanding equation (3), the combiner matrices are of the form:

$$I - \alpha R_1 + \alpha R_2 - \alpha R_3 + \ldots \qquad \text{equ. (22)}$$

Here, $R_i$ matrices are formed from the sum of products of $X_j \cdot X_j^T$ matrices. Since $\alpha$ is a small number, the sum is dominated by I. For a combiner matrix M generated from n data instances, M−I has at most n non-zero singular values. Accordingly, the variance of dimensionality reduction can be lowered by projecting matrix N=M−I instead of M. Rewriting equations (4) and (19), produces:

$$w_i = l_i + (N_i + I) \cdot (w_{i-1} - w_0) \qquad \text{equ. (23)}$$

$$w_i = l_i + w_{i-1} - w_0 + N_i \cdot (w_{i-1} - w_0) \qquad \text{equ. (24)}$$

$$w_i \approx l_i + w_{i-1} - w_0 + N_i \cdot A \cdot A^T \cdot (w_{i-1} - w_0) \qquad \text{equ. (25)}$$

Lemma (2) ensures that the approximation above is unbiased. Example Algorithm 2 shows the pseudo code for the resulting probabilistically sound combination of local models. The function SymSGDCombine in Example Algorithm 2 is called upon iteratively to combine the model of one processing node with the local models of other processing nodes.

Figure 6:
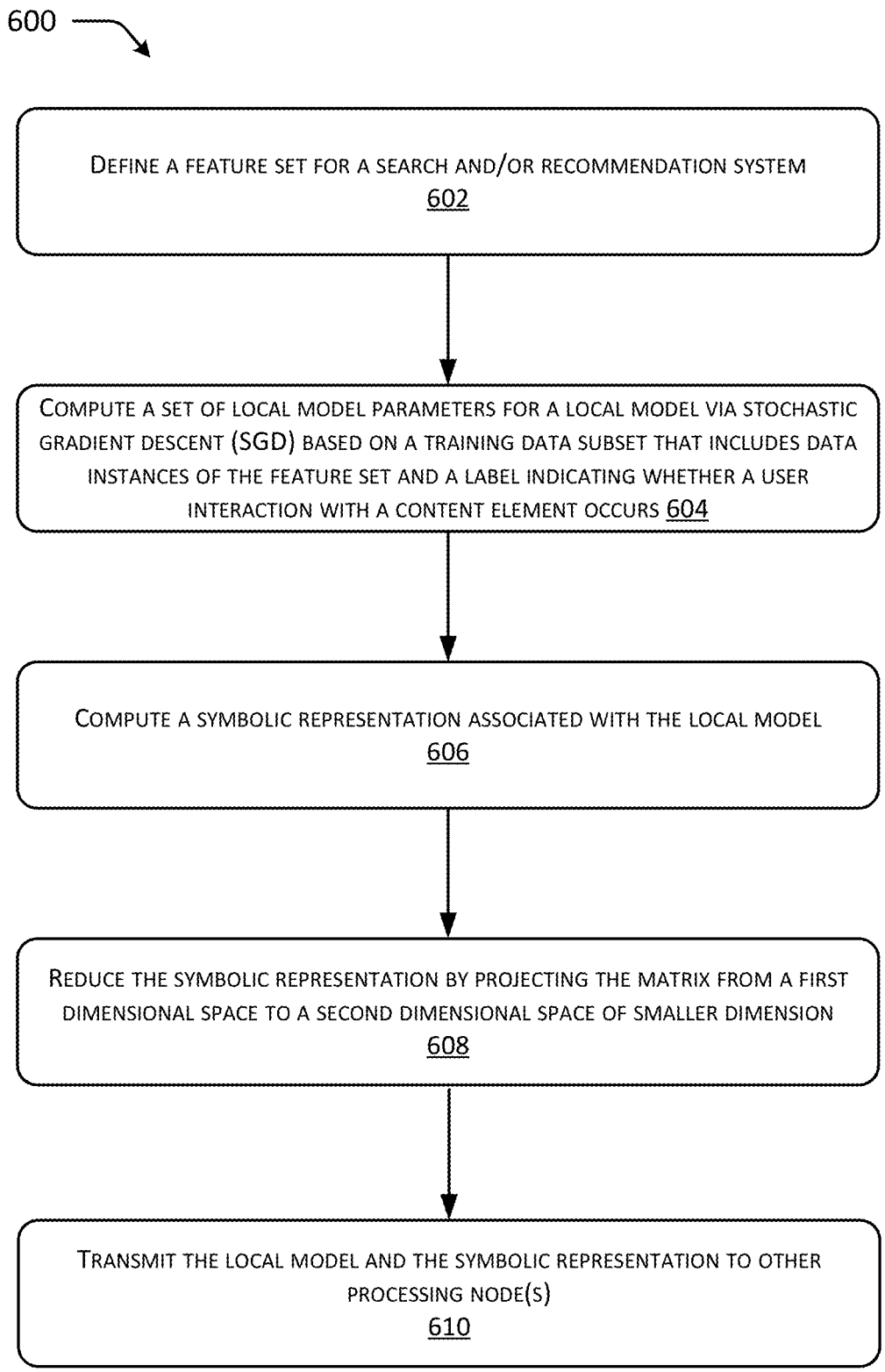
FIG. 6 is a diagram of an example flowchart that illustrates operations directed to computing a local model and a symbolic representation at a processing node, and subsequently sending the local model and the symbolic representation to other processing nodes so the local model can be combined with other local models to generate a global model.
Figure 7:
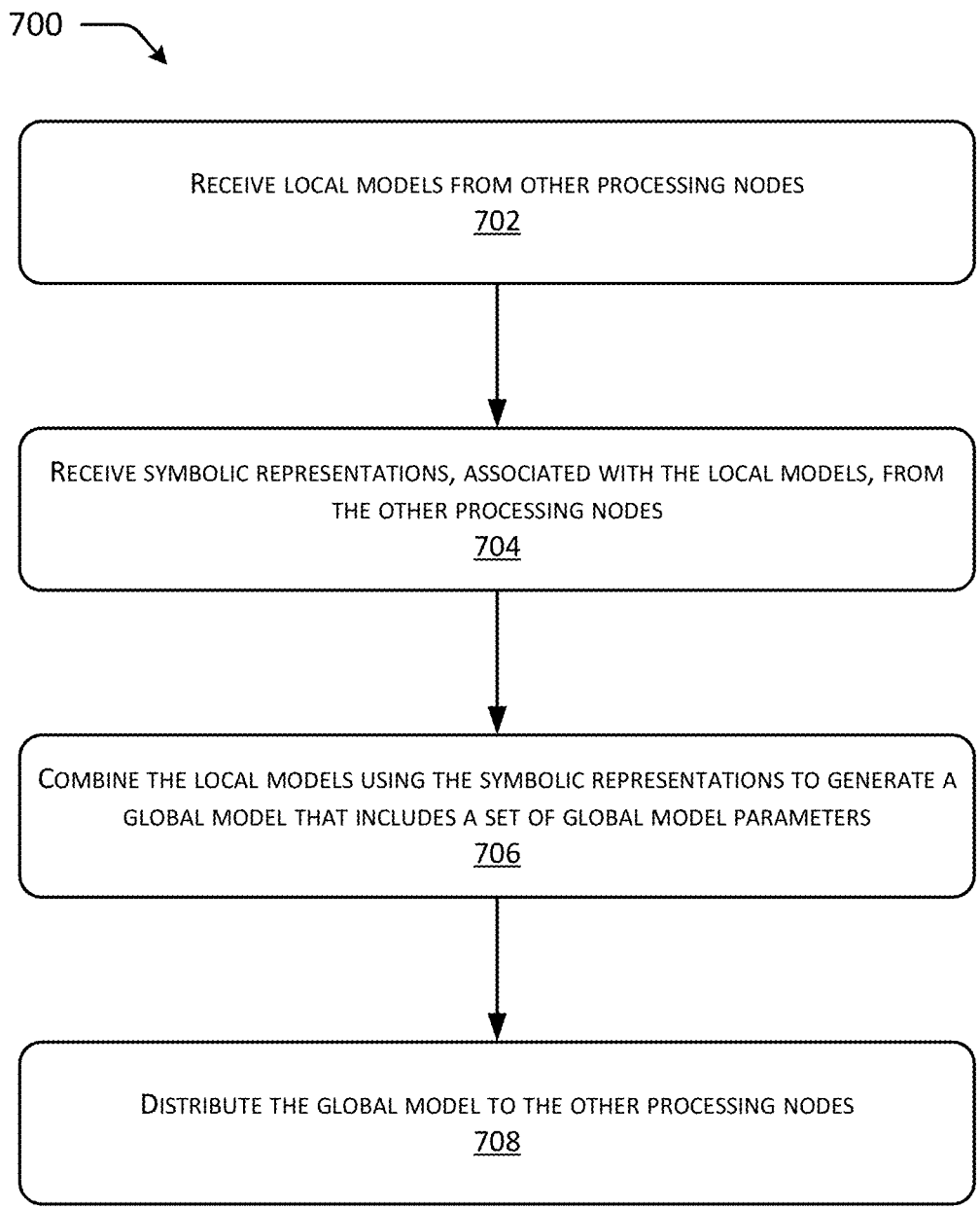
FIG. 7 is a diagram of an example flowchart that illustrates operations directed to combining local models into a global model using symbolic representations.
Figure 8:
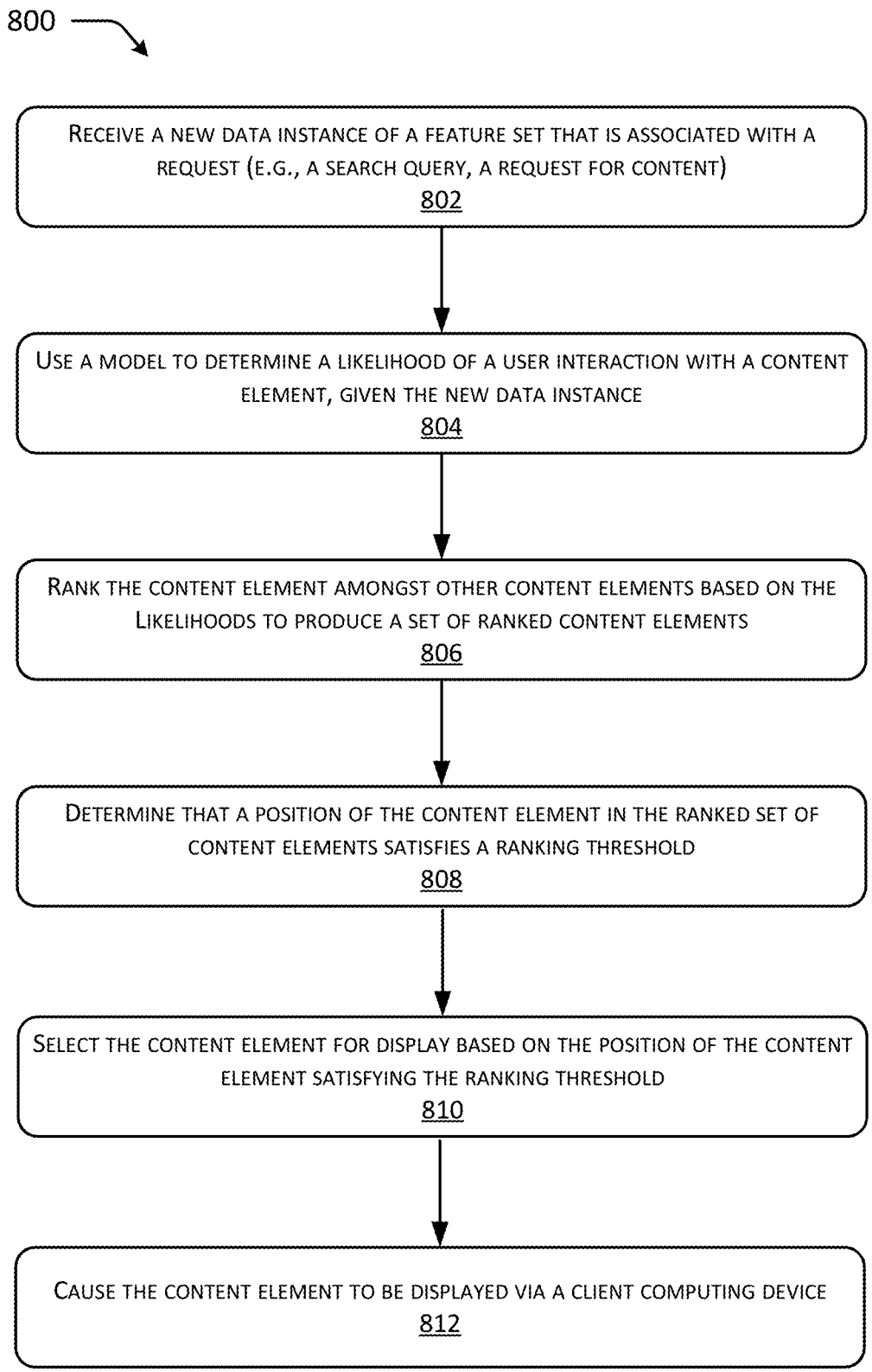
FIG. 8 is a diagram of an example flowchart that illustrates operations directed to using a model (e.g., a global model) to select a content element to display on a client computing device.

FIGS. 6-8 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., one or more devices of system 102 such as device 500) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 6 is a diagram of an example flowchart 600 that illustrates operations directed to computing a local model and a symbolic representation at a processing node, and subsequently sending the local model and the symbolic representation to other processing nodes so the local model can be combined with other local models to generate a global model. In one example, the operations of FIG. 6 can be performed by one or more devices and/or other components of the system 102 (e.g., a processing node).

At operation 602, a feature set is defined for a search and/or recommendation system. An individual feature in the feature set can be related to user and/or device information.

At operation 604, a set of local model parameters for a local model is computed via stochastic gradient descent (SGD) based on a training data subset that includes data instances of the feature set and a label indicating whether a user interaction with a content element occurs. As described above, the local model is computed in parallel with other local models, based on a same set of starting model parameters.

At operation 606, a symbolic representation associated with the local model is computed. The symbolic representation represents how an adjustment to the set of starting model parameters affects the set of local model parameters computed for the local model.

At operation 608, in various examples, the symbolic representation (e.g., a matrix) is reduced by projecting the matrix from a first dimensional space to a second dimensional space of smaller dimension. For example, an identity matrix comprising a diagonal entry can be removed or subtracted from the matrix.

At operation 610, the local model and the symbolic representation are transmitted to one or more other processing nodes configured in other geographic locations.

In various examples, these operation in FIG. 6 can be repeated by a processing node. For example, the processing node can continuously update a local model based on a locally expanding training data subset. Moreover, the process node can compute and/or transmit the local model and the symbolic representation in accordance with a schedule. In some examples, the processing node can receive a global model in return, the global model at that point becoming the local model that can be continuously updated.

FIG. 7 is a diagram of an example flowchart 700 that illustrates operations directed to combining local models into a global model using symbolic representations. In one example, the operations of FIG. 7 can be performed by one or more devices and/or other components of the system 102 (e.g., a processing node).

At operation 702, local models are received from other processing nodes.

At operation 704, symbolic representations associated with the local models are received from the other processing nodes.

At operation 706, the local models are combined using the symbolic representation to generate a global model that includes a set of global model parameters. As described above, the global model is configured to determine a likelihood of a user interaction with the content element given a new (e.g., unlabeled) data instance of the feature set.

At operation 708, in various examples, the global model can be distributed to the other processing nodes.

FIG. 8 is a diagram of an example flowchart 800 that illustrates operations directed to using a model (e.g., a global model) to select a content element to display on a client computing device. In one example, the operations of FIG. 8 can be performed by one or more devices and/or other components of the system 102.

At operation 802, a new data instance of a feature set is received. The new data instance can be associated with a request by a user and from a client computing device (e.g., a search query, a request for content, etc.).

At operation 804, a model is used to determine a likelihood of a user interaction with a content element, given the new data instance.

At operation 806, the content element is ranked amongst other content elements based on the likelihood to produce a set of ranked content elements.

At operation 808, a position of the content element in the ranked set of content elements is determined to satisfy a ranking threshold.

At operation 810, the content element is selected for display based on the position of the content element satisfying the ranking threshold.

At operation 812, the content element is caused to be displayed via the client computing device.

The disclosure presented herein may be considered in view of the following example clauses.

Example Clause A, a method comprising: defining a feature set, an individual feature in the feature set being related to at least one of user information or device information; receiving, via a network at a first processing node and from a plurality of other processing nodes, a plurality of local models that individually comprise a set of local model parameters computed via stochastic gradient descent (SGD) based at least in part on a training data subset that includes multiple data instances of the feature set and, for each data instance of the feature set, a label indicating whether a user interaction with a content element occurs, wherein the plurality of local models and the sets of local model parameters comprised therein are computed in parallel by the plurality of other processing nodes based at least in part on a set of starting model parameters; receiving, at the first processing node and from the plurality of other processing nodes, a plurality of symbolic representations associated with the plurality of local models, wherein an individual symbolic representation associated with an individual local model is computed to represent how an adjustment to the set of starting model parameters affects the set of local model parameters computed for the individual local model; combining, at the first processing node using the plurality of symbolic representations, the plurality of local models received from the plurality of other processing nodes with a local model computed at the first processing node, the combining generating a global model that includes a set of global model parameters, the global model configured to determine a likelihood of a new user interaction with the content element given a new data instance of the feature set; receiving, at the first processing node and from a client computing device, the new data instance of the feature set along with a request; and determining, using the global model and the new data instance of the feature set, the likelihood of the new user interaction with the content element.

Example Clause B, the method of Example Clause A, further comprising: ranking, based at least in part on the likelihood, the content element amongst other content elements to produce a set of ranked content elements; determining that a ranked position of the content element in the set of ranked content elements satisfies a ranking threshold; selecting, based at least in part on the ranked position of the content element in the set of ranked content elements satisfying the ranking threshold, the content element for display via the client computing device in response to receiving the request; and causing the content element to be displayed via the client computing device.

Example Clause C, the method of Example Clause A or Example Clause B, further comprising distributing the global model to the plurality of other processing nodes.

Example Clause D, the method of any one of Example Clauses A through C, wherein the feature set comprises at least two of: an age or age range, gender, education, profession, annual income, city and state of residence, a zip code for a home address, an area code for a phone number, citizenship, languages spoken, user interests, health information, a time of day the request is submitted, or an IP address.

Example Clause E, the method of any one of Example Clauses A through D, wherein the content element comprises one of: a hyperlink displayable via a search engine results page (SERP) or suggested content placed amongst requested content.

Example Clause F, the method of any one of Example Clauses A through E, wherein the first processing node and the plurality of other processing nodes are configured in different datacenters operating in different geographic locations.

Example Clause G, the method of any one of Example Clauses A through F, wherein the set of global model parameters are essentially the same as a corresponding set of model parameters that would have been computed had the local model and the plurality of local models and the corresponding training data subsets been computed sequentially in an order in which the plurality of symbolic representations were applied rather than in parallel.

Example Clause H, the method of any one of Example Clauses A through G, wherein the adjustment is an unknown adjustment at a time the individual symbolic representation is computed.

Example Clause I, the method of Example Clause H, wherein the adjustment to the set of starting model parameters comprises shifting the set of starting model parameters to a known set of starting model parameters associated with an output of another local model, the output comprising the set of local model parameters computed for the other local model.

Example Clause J, the method of any one of Example Clauses A through I, wherein the individual symbolic representation comprises a matrix.

Example Clause K, the method of Example Clause J, wherein a dimension of the matrix has been reduced by projecting the matrix from a first dimensional space to a second dimensional space of smaller dimension.

Example Clause L, the method of Example Clause K, wherein the second dimensional space is generated on random bases.

Example Clause M, the method of Example Clause K, wherein the plurality of local models and the plurality of symbolic representations are received based at least in part on a schedule that ensures that a variance associated with projecting the matrix from the first dimensional space to the second dimensional space is less than a threshold variance.

Example Clause N, the method of Example Clause K, wherein reducing the dimension of the matrix comprises removal of an identity matrix from the matrix, the identity matrix comprising a diagonal entry.

While Example Clauses A through N are described above with respect to a method, the subject matter of Example Clauses A through N can also and/or alternatively be implemented by a device, by a system, and/or via computer-readable storage media.

Example Clause O, a system comprising: one or more processing units; and a computer-readable medium having encoded thereon computer-executable instructions to cause the one or more processing units to: receive, via a network at a first processing node and from a plurality of other processing nodes, a plurality of local models that individually comprise a set of local model parameters computed via stochastic gradient descent (SGD) based at least in part on a training data subset that includes multiple data instances of a feature set and, for each data instance of the feature set, a label indicating whether a user interaction with a content element occurs, wherein the plurality of local models and the sets of local model parameters comprised therein are computed in parallel by the plurality of other processing nodes based at least in part on a set of starting model parameters; receive, at the first processing node and from the plurality of other processing nodes, a plurality of symbolic representations associated with the plurality of local models, wherein an individual symbolic representation associated with an individual local model is computed to represent how an adjustment to the set of starting model parameters affects the set of local model parameters computed for the individual local model; combine, at the first processing node using the plurality of symbolic representations, the plurality of local models received from the plurality of other processing nodes with a local model computed at the first processing node, the combining generating a global model that includes a set of global model parameters, the global model configured to determine a likelihood of a new user interaction with the content element given a new data instance of the feature set; receive, at the first processing node and from a client computing device, the new data instance of the feature set along with a request; and determine, using the global model and the new data instance of the feature set, the likelihood of the new user interaction with the content element.

Example Clause P, the system of Example Clause O, wherein the computer-executable instructions further cause the one or more processing units to: rank, based at least in part on the likelihood, the content element amongst other content elements to produce a set of ranked content elements; determine that a ranked position of the content element in the set of ranked content elements satisfies a ranking threshold; select, based at least in part on the ranked position of the content element in the set of ranked content elements satisfying the ranking threshold, the content element for display via the client computing device in response to receiving the request; and cause the content element to be displayed via the client computing device.

Example Clause Q, the system of Example Clause O or Example Clause P, wherein the adjustment to the set of starting model parameters comprises shifting the set of starting model parameters to a known set of starting model parameters associated with an output of another local model, the output comprising the set of local model parameters computed for the other local model.

Example Clause R, the system of any one of Example Clauses O through Q, wherein the individual symbolic representation comprises a matrix, wherein a dimension of the matrix has been reduced by projecting the matrix from a first dimensional space to a second dimensional space of smaller dimension, wherein reducing the dimension of the matrix comprises removal of an identity matrix from the matrix, the identity matrix comprising a diagonal entry.

Example Clause S, the system of Example Clause R, wherein the plurality of local models and the plurality of symbolic representations are received based at least in part on a schedule that ensures that a variance associated with projecting the matrix from the first dimensional space to the second dimensional space is less than a threshold variance.

While Example Clauses O through S are described above with respect to a system, the subject matter of Example Clauses O through S can also and/or alternatively be implemented by a device, as a method, and/or via computer-readable storage media.

Example Clause T, a system comprising: one or more processing units; and a computer-readable medium having encoded thereon computer-executable instructions to cause the one or more processing units to: compute a local model that comprises a set of local model parameters computed via stochastic gradient descent (SGD) based at least in part on a training data subset that includes multiple data instances of a feature set and, for each data instance of the feature set, a label indicating whether a user interaction with a content element occurs; compute a symbolic representation associated with the local model, wherein the symbolic representation comprises a matrix that represents how an adjustment to a set of starting model parameters affects the set of local model parameters computed for the local model; reduce a size of the matrix by projecting the matrix from a first dimensional space to a second dimensional space of smaller dimension; and transmit the local model and the symbolic representation to processing nodes over a network to enable a global model to be generated, the global model useable to determine a likelihood of a new user interaction with the content element given a new data instance.

While Example Clause T is described above with respect to a system, the subject matter of Example Clause T can also and/or alternatively be implemented by a device, as a method, and/or via computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    defining a feature set, an individual feature in the feature set being related to at least one of user information or device information;
    receiving, via a network at a first processing node and from a plurality of other processing nodes, a plurality of local models that individually comprise a set of local model parameters computed via stochastic gradient descent (SGD) based at least in part on a training data subset that includes multiple data instances of the feature set and, for each data instance of the feature set, a label indicating whether a user interaction with a content element occurs, wherein the plurality of local models and the sets of local model parameters comprised therein are computed in parallel by the plurality of other processing nodes based at least in part on a set of starting model parameters;
    receiving, at the first processing node and from the plurality of other processing nodes, a plurality of symbolic representations associated with the plurality of local models, wherein:
        each of the plurality of symbolic representations is computed at an individual other processing node; and
        an individual symbolic representation associated with an individual local model is computed to represent how an adjustment to the set of starting model parameters affects the set of local model parameters computed for the individual local model by shifting the set of starting model parameters to a known set of starting model parameters associated with an output of another local model;
    combining, at the first processing node using at least some of the plurality of symbolic representations to honor sequential dependencies of SGD, the plurality of local models received from the plurality of other processing nodes with a local model computed at the first processing node, wherein the combining is implemented in accordance with a combination order for the plurality of local models and the combining generates a global model that includes a set of global model parameters, the global model configured to determine a likelihood of a new user interaction with the content element given a new data instance of the feature set;
    receiving, at the first processing node and from a client computing device, the new data instance of the feature set along with a request; and
    determining, using the global model and the new data instance of the feature set, the likelihood of the new user interaction with the content element.

2. The method of claim 1, further comprising:
    ranking, based at least in part on the likelihood, the content element amongst other content elements to produce a set of ranked content elements;
    determining that a ranked position of the content element in the set of ranked content elements satisfies a ranking threshold;
    selecting, based at least in part on the ranked position of the content element in the set of ranked content elements satisfying the ranking threshold, the content element for display via the client computing device in response to receiving the request; and
    causing the content element to be displayed via the client computing device.

3. The method of claim 1, further comprising distributing the global model to the plurality of other processing nodes.

4. The method of claim 1, wherein the feature set comprises at least two of: an age or age range, gender, education, profession, annual income, city and state of residence, a zip code for a home address, an area code for a phone number, citizenship, languages spoken, user interests, health information, a time of day the request is submitted, or an IP address.

5. The method of claim 1, wherein the content element comprises one of:
a hyperlink displayable via a search engine results page (SERP) or suggested content placed amongst requested content.

6. The method of claim 1, wherein the first processing node and the plurality of other processing nodes are configured in different datacenters operating in different geographic locations.

7. The method of claim 1, wherein the set of global model parameters are essentially the same as a corresponding set of model parameters that would have been computed had the local model and the plurality of local models and the corresponding training data subsets been computed sequentially in an order in which the plurality of symbolic representations were applied rather than in parallel.

8. The method of claim 1, wherein the adjustment is an unknown adjustment at a time the individual symbolic representation is computed.

9. The method of claim 1, wherein the individual symbolic representation comprises a matrix.

10. The method of claim 9, wherein a dimension of the matrix has been reduced by projecting the matrix from a first dimensional space to a second dimensional space of smaller dimension.

11. The method of claim 10, wherein the second dimensional space is generated on random bases.

12. The method of claim 10, wherein the plurality of local models and the plurality of symbolic representations are received based at least in part on a schedule that ensures that a variance associated with projecting the matrix from the first dimensional space to the second dimensional space is less than a threshold variance.

13. The method of claim 10, wherein reducing the dimension of the matrix comprises removal of an identity matrix from the matrix, the identity matrix comprising a diagonal entry.

14. A system comprising:
one or more processing units; and
a computer-readable medium having encoded thereon computer-executable instructions to cause the one or more processing units to:
receive, via a network at a first processing node and from a plurality of other processing nodes, a plurality of local models that individually comprise a set of local model parameters computed via stochastic gradient descent (SGD) based at least in part on a training data subset that includes multiple data instances of a feature set and, for each data instance of the feature set, a label indicating whether a user interaction with a content element occurs, wherein the plurality of local models and the sets of local model parameters comprised therein are computed in parallel by the plurality of other processing nodes based at least in part on a set of starting model parameters;
receive, at the first processing node and from the plurality of other processing nodes, a plurality of symbolic representations associated with the plurality of local models, wherein:
each of the plurality of symbolic representations is computed at an individual other processing node; and
an individual symbolic representation associated with an individual local model is computed to represent how an adjustment to the set of starting model parameters affects the set of local model parameters computed for the individual local model by shifting the set of starting model parameters to a known set of starting model parameters associated with an output of another local model;
combine, at the first processing node using at least some of the plurality of symbolic representations to honor sequential dependencies of SGD, the plurality of local models received from the plurality of other processing nodes with a local model computed at the first processing node, wherein the combining is implemented in accordance with a combination order for the plurality of local models and the combining generates a global model that includes a set of global model parameters, the global model configured to determine a likelihood of a new user interaction with the content element given a new data instance of the feature set;
receive, at the first processing node and from a client computing device, the new data instance of the feature set along with a request; and
determine, using the global model and the new data instance of the feature set, the likelihood of the new user interaction with the content element.

15. The system of claim 14, wherein the computer-executable instructions further cause the one or more processing units to:
rank, based at least in part on the likelihood, the content element amongst other content elements to produce a set of ranked content elements;
determine that a ranked position of the content element in the set of ranked content elements satisfies a ranking threshold;
select, based at least in part on the ranked position of the content element in the set of ranked content elements satisfying the ranking threshold, the content element for display via the client computing device in response to receiving the request; and
cause the content element to be displayed via the client computing device.

16. The system of claim 14, wherein the individual symbolic representation comprises a matrix, wherein a dimension of the matrix has been reduced by projecting the matrix from a first dimensional space to a second dimensional space of smaller dimension, wherein reducing the dimension of the matrix comprises removal of an identity matrix from the matrix, the identity matrix comprising a diagonal entry.

17. The system of claim 16, wherein the plurality of local models and the plurality of symbolic representations are received based at least in part on a schedule that ensures that a variance associated with projecting the matrix from the first dimensional space to the second dimensional space is less than a threshold variance.

18. A system comprising:
one or more processing units; and
a computer-readable medium having encoded thereon computer-executable instructions to cause the one or more processing units to:
compute a local model that comprises a set of local model parameters computed via stochastic gradient descent (SGD) based at least in part on a training data subset that includes multiple data instances of a feature set and, for each data instance of the feature set, a label indicating whether a user interaction with a content element occurs;
compute a symbolic representation associated with the local model, wherein the symbolic representation comprises a matrix that represents how an adjustment to a set of starting model parameters affects the set of local model parameters computed for the local model by shifting the set of starting model parameters to a known set of starting model parameters associated with an output of another local model;

reduce a size of the matrix by projecting the matrix from a first dimensional space to a second dimensional space of smaller dimension, wherein reducing the size of the matrix comprises removal of an identity matrix from the matrix, the identity matrix comprising a diagonal entry; and transmit the local model and the symbolic representation to processing nodes over a network to enable a global model to be generated, the global model useable to determine a likelihood of a new user interaction with the content element given a new data instance.

19. The system of claim 18, wherein the second dimensional space is generated on random bases.

* * * * *